(12) United States Patent
Namiki et al.

(10) Patent No.: US 10,133,501 B2
(45) Date of Patent: Nov. 20, 2018

(54) DATA GENERATING APPARATUS, DATA GENERATING METHOD, AND DATA RECORDING SYSTEM

(71) Applicants: Hitoshi Namiki, Kanagawa (JP); Hiroshi Kobayashi, Kanagawa (JP); Ryouji Yamamoto, Kanagawa (JP)

(72) Inventors: Hitoshi Namiki, Kanagawa (JP); Hiroshi Kobayashi, Kanagawa (JP); Ryouji Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/703,286

(22) Filed: Sep. 13, 2017

(65) Prior Publication Data

US 2018/0088814 A1  Mar. 29, 2018

(30) Foreign Application Priority Data

Sep. 28, 2016 (JP) .................................. 2016-190183

(51) Int. Cl.
*G06F 3/06* (2006.01)
*H04L 9/32* (2006.01)

(52) U.S. Cl.
CPC ............. *G06F 3/064* (2013.01); *G06F 3/067* (2013.01); *G06F 3/0623* (2013.01); *H04L 9/3247* (2013.01)

(58) Field of Classification Search
CPC ........ G06F 3/0623; G06F 3/064; G06F 3/067; H04L 9/3247
See application file for complete search history.

(56) References Cited

U.S. PATENT DOCUMENTS 7,783,890 B2    8/2010  Watanabe

FOREIGN PATENT DOCUMENTS

JP    2006-086661    3/2006
JP    2015-088855    5/2015

OTHER PUBLICATIONS

U.S. Appl. No. 15/433,112, filed Feb. 15, 2017.
U.S. Appl. No. 15/447,334, filed Mar. 2, 2017.

*Primary Examiner* — Yong J Choe
(74) *Attorney, Agent, or Firm* — IPUSA, PLLC

(57) ABSTRACT

A data generating apparatus is provided that includes a memory storing a program and a processor configured to execute the program to implement processes of sequentially acquiring n sets of data (where n is an integer greater than or equal to 2) included in a predetermined section of time series data and calculating, based on the acquired data, parameter information satisfying a polynomial of degree (k-1) including k random numbers (where k is an integer greater than or equal to 1 and less than n); generating a signature value by adding a signature to secret information based on a secret sharing protocol, the secret information being calculable by acquiring k sets of the acquired data and the parameter information calculated based on the acquired data; and outputting output data including the signature value and a set of the acquired data and the parameter information calculated based on the acquired data.

7 Claims, 19 Drawing Sheets

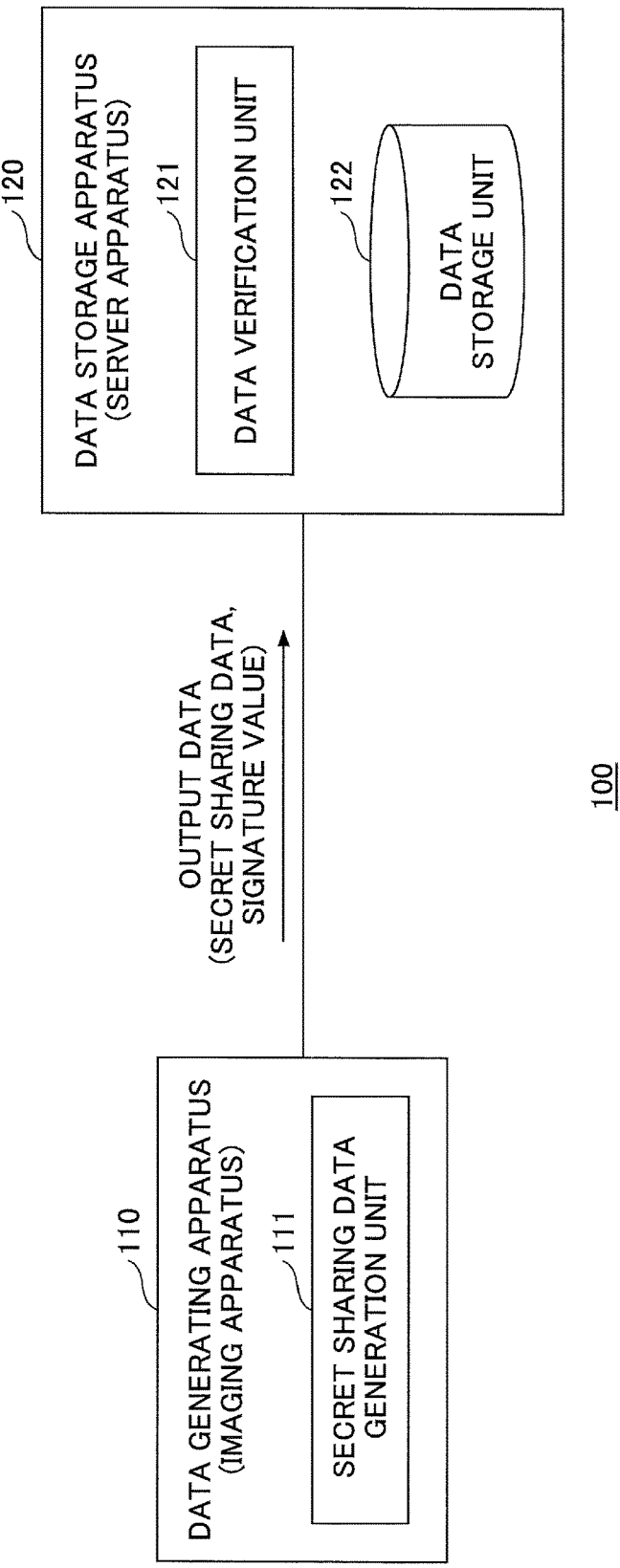

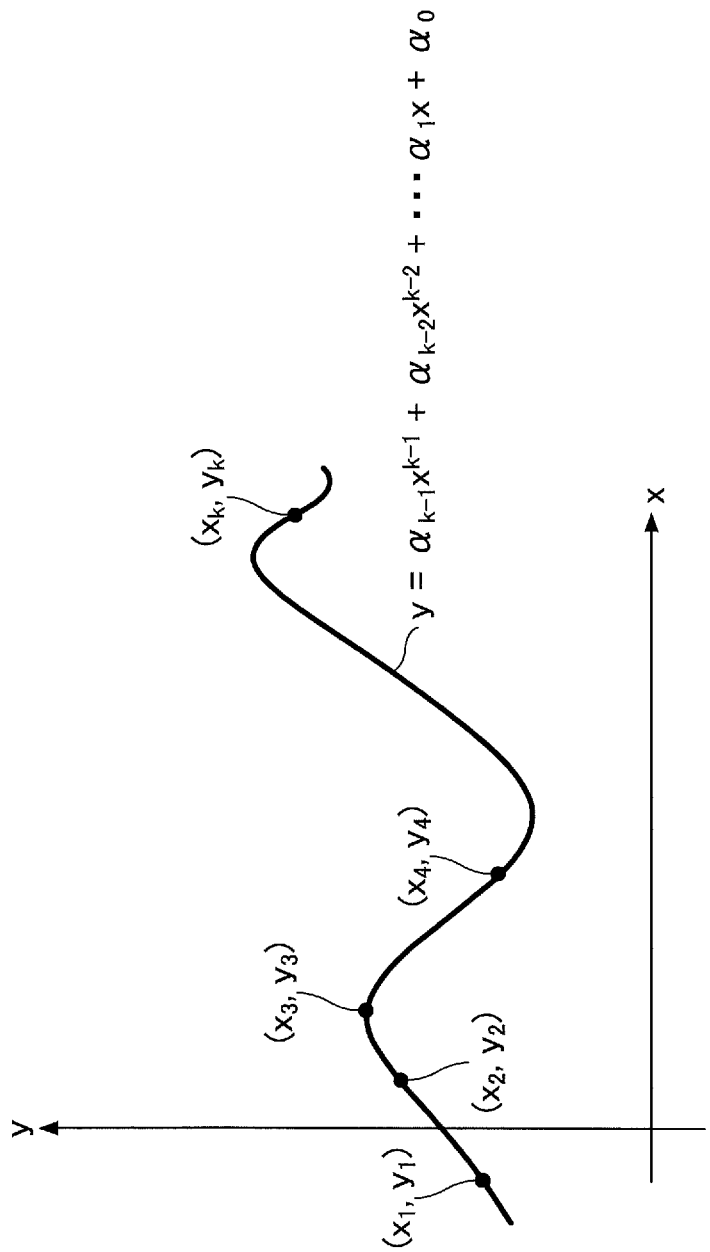

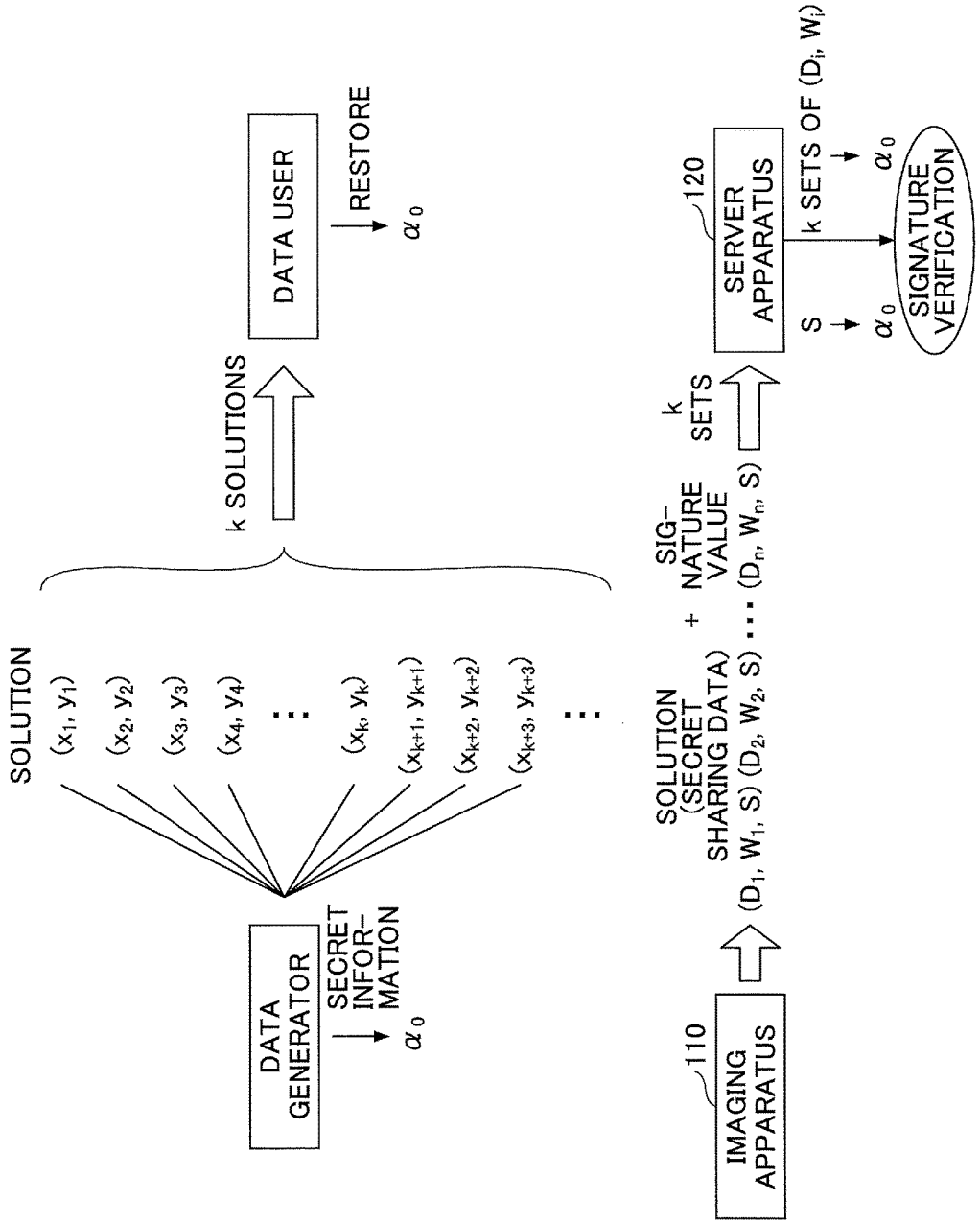

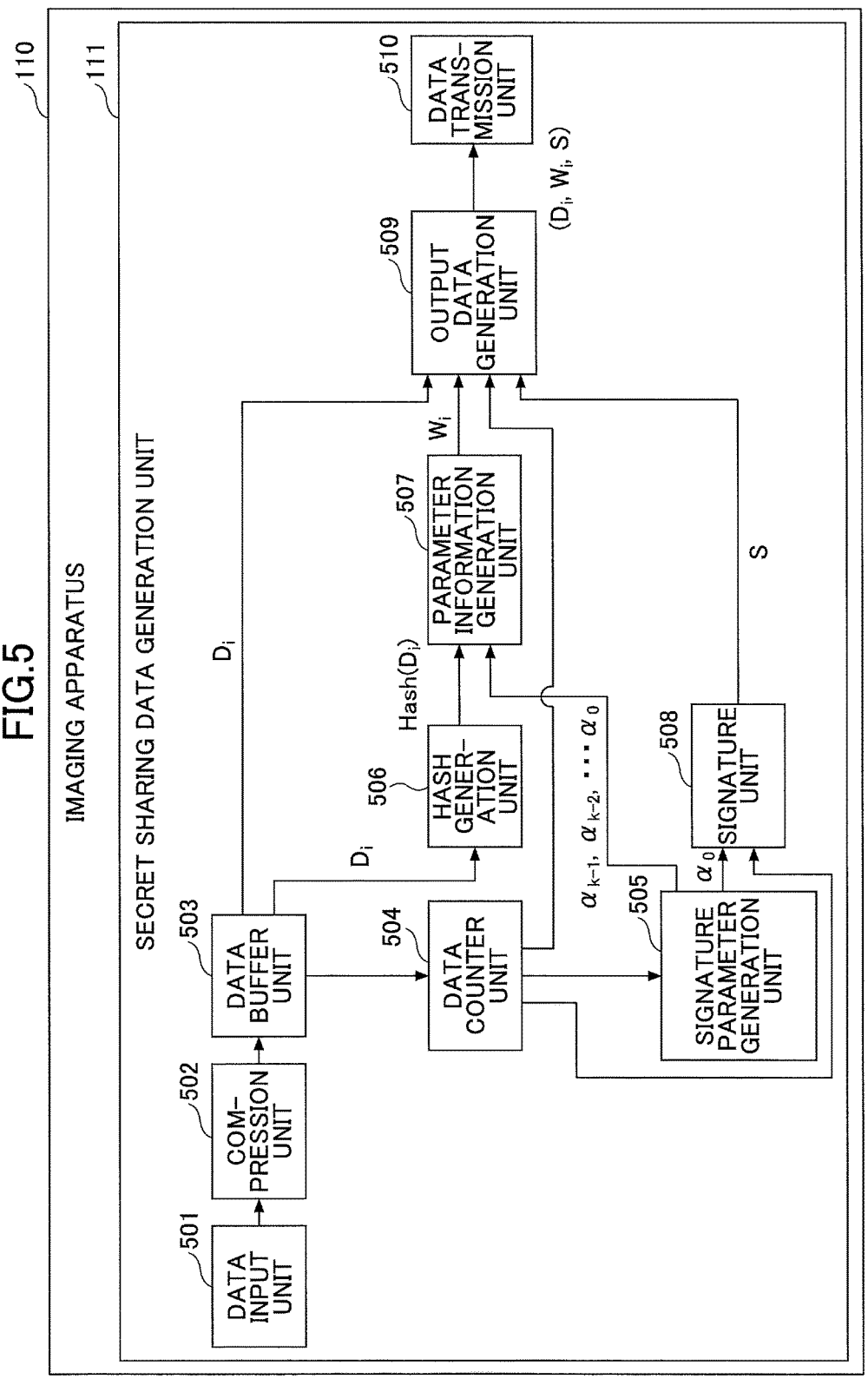

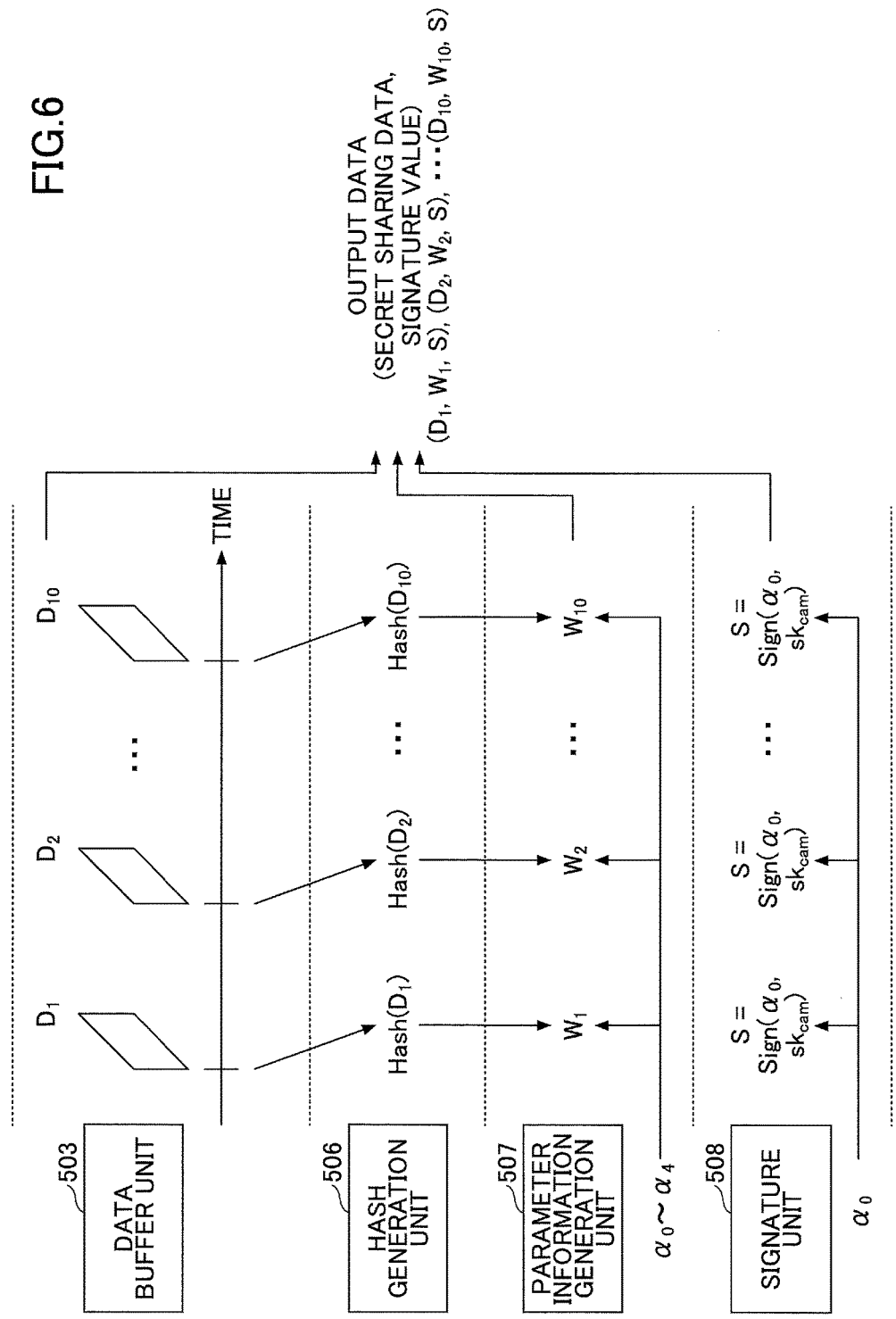

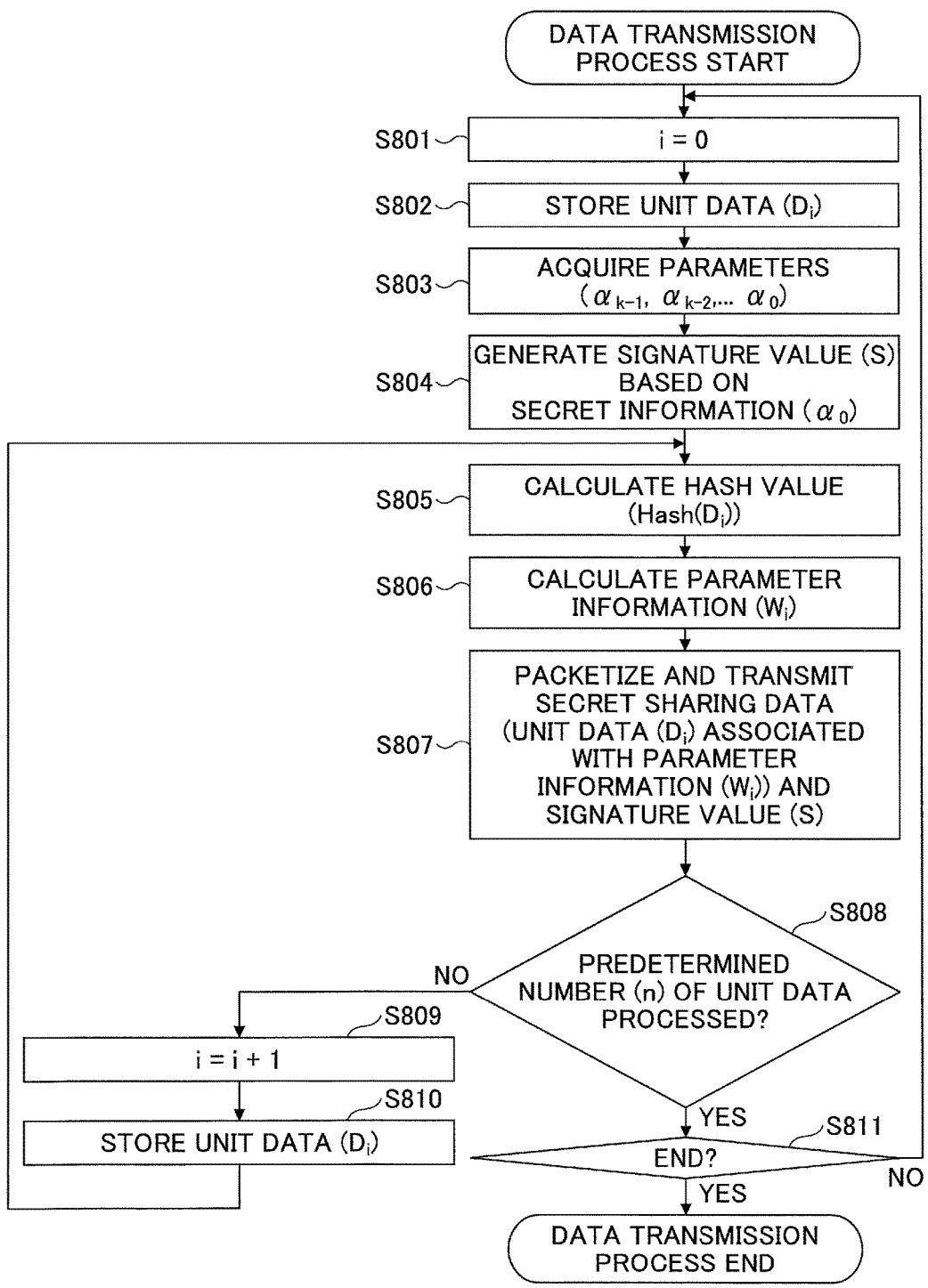

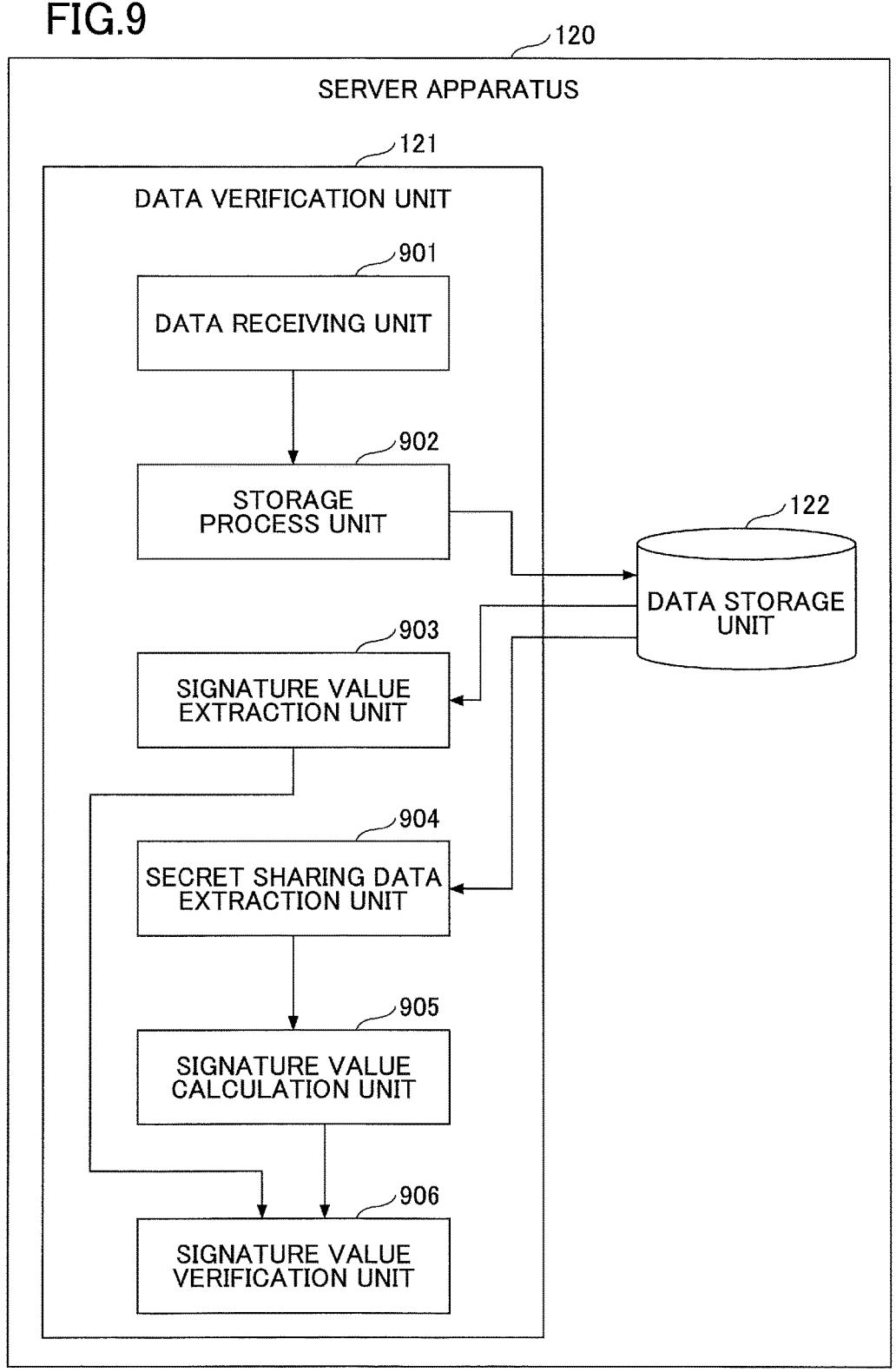

DATA GENERATING APPARATUS, DATA GENERATING METHOD, AND DATA RECORDING SYSTEM

CROSS-REFERENCE TO RELATED APPLICATIONS

The present application claims priority under 35 U.S.C. § 119 to Japanese Patent Application No. 2016-190183 filed on Sep. 28, 2016, the entire contents of which are incorporated herein by reference.

BACKGROUND OF THE INVENTION

1. Field of the Invention

The present invention relates to a data generating apparatus, a data generating method, and a data recording system.

2. Description of the Related Art

Data recording systems configured by a data generating apparatus, such as an imaging apparatus, and a data storage apparatus, such as a server apparatus, that receives time series data (e.g., moving image data) generated by the data generating apparatus via a network and stores the received time series data are known. In such data recording systems, a technique may be implemented for guaranteeing data authenticity by adding a signature to the time series data at the data generating apparatus side, and performing signature verification at the data storage apparatus side (see, e.g., Japanese Unexamined Patent Publication No. 2015-088855).

However, in the case of implementing the above technique in a data recording system, if any data loss occurs when the data storage apparatus receives data having a signature added thereto, the data storage apparatus may be unable to perform signature verification. As such, even if data that is not lost has not been tampered with, the authenticity of the data cannot be verified and the above technique is lacking in practicality.

Also, in the case of implementing the above technique in a data recording system, a signature value is transmitted in parallel with the time series data. As such, communication speed of the time series data may potentially be decreased. Further, the above technique has other various practical issues, such as the need for the data generating apparatus to hold onto the signature value for a certain period of time after transmission thereof and the need for the data storage apparatus to manage the relationship between the time series data and the signature value, for example.

SUMMARY OF THE INVENTION

According to one embodiment of the present invention, a data generating apparatus is provided that includes a memory storing a program and a processor configured to execute the program to implement processes of sequentially acquiring n sets of data (where n is an integer greater than or equal to 2) included in a predetermined section of time series data and calculating, based on the acquired data, parameter information satisfying a polynomial of degree (k−1) including k random numbers (where k is an integer greater than or equal to 1 and less than n); generating a signature value by adding a signature to secret information based on a secret sharing protocol, the secret information being calculable by acquiring k sets of the acquired data and the parameter information calculated based on the acquired data; and outputting output data including the signature value and a set of the acquired data and the parameter information calculated based on the acquired data.

BRIEF DESCRIPTION OF THE DRAWINGS

FIG. 1 is a diagram illustrating an example system configuration of a data recording system according to a first embodiment of the present invention;

FIGS. 3A-3C are diagrams describing example applications of secret sharing protocols;

FIG. 5 is a diagram illustrating an example functional configuration of the imaging apparatus according to the first embodiment;

FIG. 6 is a diagram schematically illustrating process operations of the imaging apparatus according to the first embodiment;

FIG. 8 is a flowchart illustrating an example process flow of a data transmission process according to the first embodiment;

FIG. 9 is a diagram illustrating an example functional configuration of the server apparatus according to the first embodiment;

DESCRIPTION OF THE EMBODIMENTS

Figure 2A:
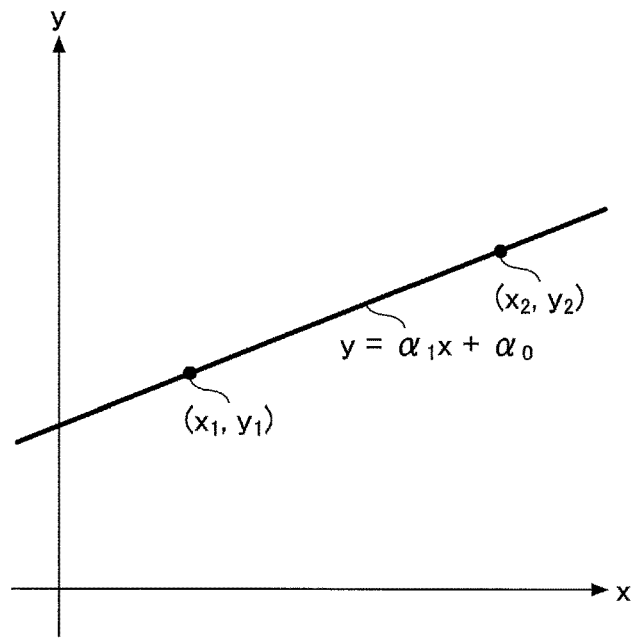
FIGS. 2A and 2B are diagrams describing examples of secret sharing protocols.

One aspect of the present invention is directed to improving practical utility of a data recording system that is capable of guaranteeing data authenticity.

In the following, embodiments of the present invention are described with reference to the accompanying drawings. Note that in the drawings and the descriptions below, elements having substantially the same features and/or func-

First Embodiment

<1. Data Recording System Configuration>

In the following, the overall configuration of a data recording system 100 according to a first embodiment of the present invention will be described. FIG. 1 is a diagram illustrating an example overall configuration of the data recording system 100.

In FIG. 1, the data recording system 100 includes a data generating apparatus 110 and a data storage apparatus 120. In the first embodiment, the data generating apparatus 110 and the data storage apparatus 120 are communicably connected via a network.

The data generating apparatus 110 is an apparatus (e.g., imaging apparatus) that generates time series data (e.g., moving image data). In the following, an imaging apparatus that generates moving image data is described as an example of the data generating apparatus 110 (hereinafter referred to as "imaging apparatus 110"). The imaging apparatus 110 has a secret sharing data generation program installed therein, and the imaging apparatus 110 functions as a secret sharing data generation unit 111 by executing the secret sharing data generation program.

The secret sharing data generation unit 111 generates secret sharing data by associating parameter information based on a secret sharing protocol with moving image data that has been generated, adds a signature value to the generated secret sharing data to generate output data, and streams the generated output data to the data storage apparatus 120. Note that the signature value is generated by adding a signature to secret information that is used by the data storage apparatus 120 upon performing signature verification on secret sharing data. In the following, secret sharing data having a signature value added thereto is referred to as "output data".

The data storage apparatus 120 stores output data transmitted from the data generating apparatus 110. In the following, a server apparatus will be described as an example of the data storage apparatus 120 (hereinafter referred to as "server apparatus 120"). The server apparatus 120 has a data verification program installed therein, and the server apparatus 120 functions as a data verification unit 121 by executing the data verification program.

The data verification unit 121 receives output data transmitted from the imaging apparatus 110 and stores the received output data in a data storage unit 122. Also, the data verification unit 121 performs signature verification by comparing secret information calculated based on the output data stored in the data storage unit 122 using the signature value as a secret key with secret information calculated based on the secret sharing data included in the received output data.

Note that even if a part of the output data streamed from the imaging apparatus 110 to the server apparatus 120 is lost, the data verification unit 121 can still perform the signature verification. This because the secret sharing data included in the output data is generated using a secret sharing protocol and is highly resistant to data loss in signature verification.

<2. Secret Sharing Protocol>

In the following, secret sharing protocols used for generating secret sharing data with high resistance to data loss in signature verification are briefly described with reference to FIGS. 2A-3C. FIGS. 2A-3C are diagrams describing examples of secret sharing protocols.

(1) Overview

Figure 2B:
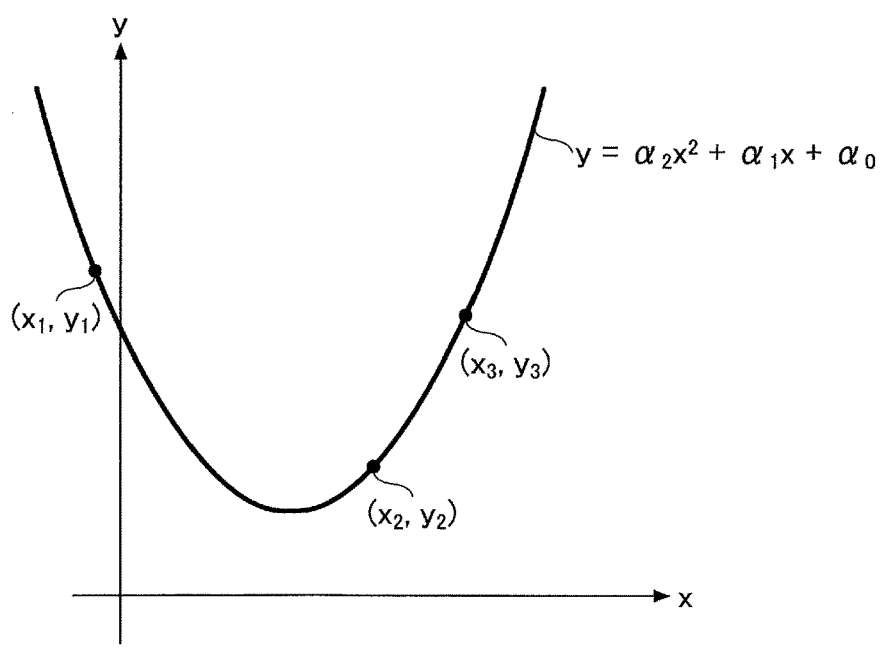

In general, a polynomial of degree (k−1) can be uniquely defined if there are k independent solutions, but a polynomial of degree (k−1) cannot be uniquely defined with (k−1) or less solutions. FIG. 2A illustrates an example case where a linear polynomial ($y=\alpha_1 x+\alpha_0$) is uniquely defined based on two independent solutions (($x_1$, $y_1$) and ($x_2$, $y_2$)). FIG. 2B illustrates an example case where a quadratic polynomial ($y=\alpha_2 x^2+\alpha_1 x+\alpha_0$) is uniquely defined based on three independent solutions (($x_1$, $y_1$), ($x_2$, $y_2$), ($x_3$, $y_3$)).

FIG. 3A illustrates an example case where a polynomial of degree (k−1) ($y=\alpha_{k-1} x^{k-1}+\alpha_{k-2} x^{k-2}+ \ldots \alpha_1 x+\alpha_0$) is uniquely defined based on k independent solutions (($x_1$, $y_1$), ($x_2$, $y_2$), ... ($x_k$, $y_k$)).

A secret sharing protocol makes use of such a relationship between a polynomial and its solution. As illustrated in FIG. 3B, when using a secret sharing protocol to generate secret sharing data, a data generator that generates secret information embeds the generated secret information in the term ($\alpha_0$) of the 0th degree of a polynomial of degree (k−1), generates a plurality of solutions of the polynomial of degree (k−1), and retains each solution separately. In this way, even when some solutions from among the plurality of solutions are leaked, the secret information ($\alpha_0$) may be prevented from being restored. That is, a secret sharing protocol has the characteristics of being highly resistant to leakage of solutions.

Also, as illustrated in FIG. 3B, when using a secret sharing protocol, a data user may be able to restore the secret information ($\alpha_0$) by obtaining k solutions out of the plurality of solutions from the data generator. That is, the polynomial of degree (k−1) can be uniquely defined based on k solutions. In other words, a secret sharing protocol also has the characteristics of being highly resistant to loss of solutions.

The secret sharing data generation unit 111 according to the first embodiment takes advantage of the above characteristics relating to high resistance to loss of solutions of the secret sharing protocol and applies the secret sharing protocol to time series data.

(2) Application of Secret Sharing Protocol to Time Series Data

The imaging apparatus 110 according to the first embodiment applies a secret sharing protocol to moving image data corresponding to time series data to thereby improve resistance to data loss in signature verification. Such application of the secret sharing protocol by the imaging apparatus 110 is described below with reference to FIG. 3C.

First, the imaging apparatus 110 acquires n sets of unit data (where n is an integer greater than or equal to 2) included in a predetermined section of moving image data corresponding to time series data. Note that in the present descriptions, "unit data" refers to data of a predetermined unit making up moving image data. For example, in a case where the imaging apparatus 110 executes processes with respect to moving image data on a frame-by-frame basis, each frame may correspond to data of a predetermined unit. Also, in a case where the imaging apparatus 110 executes processes on moving image data on a packet-by-packet basis, for example, each packet may correspond to data of a predetermined unit. In the following descriptions, each unit data of the n sets of unit data is denoted as "$D_i$" where "i" corresponds to an integer between 1 and n.

Then, the imaging apparatus 110 generates n solutions of a polynomial of degree (k−1) based on the n sets of unit data ($D_i$). At this time, random numbers are used for the k parameters ($\alpha_{k-1}, \alpha_{k-2}, \ldots \alpha_0$) of the polynomial of degree (k−1) (where k is an integer greater than or equal to 1 and less than n).

In the present embodiment, a hash value Hash($D_i$) of the n sets of data is used to substitute the variable x of the polynomial of degree (k−1). By substituting the hash value Hash($D_i$) with the variable x, n values of the variable y are calculated, and each of these values is represented as parameter information "$W_i$" (where i is an integer between 1 and n). The parameter information "$W_i$" can be calculated based on the following Formula 1.

$$W_i = \Sigma_{(t=0 \sim k-1)} \alpha_t \times \text{Hash}(D_i)^t \quad \text{(Formula 1)}$$

In this way, the imaging apparatus 110 can calculate n solutions ($D_i$, $W_i$) of the polynomial of degree (k−1) (y=$\alpha_{k-1}x^{k-1} + \alpha_{k-2}x^{k-2} + \ldots \alpha_1 x + \alpha_0$) based on the n sets of unit data. The imaging apparatus 110 transmits the calculated n solutions ($D_i$, $W_i$) as secret sharing data to the server apparatus 120. That is, in the present embodiment, secret sharing data corresponds to a combination of unit data and corresponding parameter information associated with the unit data.

Note that even if a part of the secret sharing data ($D_i$, $W_i$) is lost, the server apparatus 120 can still calculate the parameters ($\alpha_{k-1}, \alpha_{k-2}, \ldots \alpha_0$) as long as it acquires at least k sets of the secret sharing data.

In the following, it is assumed that k sets of secret sharing data have not been tampered with. In this case, the parameters ($\alpha_{k-1}, \alpha_{k-2}, \ldots \alpha_0$) calculated based on the k sets of the secret sharing data by the server apparatus 120 will match the parameters ($\alpha_{k-1}, \alpha_{k-2}, \ldots \alpha_0$) of the polynomial of degree (k−1) used by the imaging apparatus 110 upon generating the n solutions. On the other hand, if the k sets of secret sharing data have been tampered with, the above parameters will not match with each other. Thus, signature verification may be performed by determining whether the above parameters match, and if the parameters match (i.e., if signature verification is successful), authenticity of the secret sharing data may be guaranteed (i.e., it may be verified that the secret sharing data has not been tampered with).

Note that in the present embodiment, the server apparatus 120 determines that signature verification of the secret sharing data ($D_i$, $W_i$) has been successful upon determining that one of the parameters ($\alpha_0$) calculated based on the secret sharing data ($D_i$, $W_i$) matches one of the parameters ($\alpha_0$) used for generating the n solutions. That is, in the present embodiment, the parameter ($\alpha_0$) corresponds to the secret information (secret information may be defined as one of the parameters that can be calculated upon acquiring k sets of secret sharing data).

In order to enable the server apparatus 120 to determine whether signature verification has been successful, the imaging apparatus 110 generates a signature value (S) by adding a signature to the secret information ($\alpha_0$) using a signing algorithm (Sign algorithm) expressed by the following Formula 2. Further, the imaging apparatus 110 adds the generated signature value (S) to the secret sharing data to generate output data ($D_i$, $W_i$, S) and streams the output data to the server apparatus 120. In this way, the imaging apparatus 110 transmits the secret sharing data having the signature value (S) added thereto to the server apparatus 120.

$$S = \text{Sign}(\alpha_0, sk_{cam}) \quad \text{(Formula 2)}$$

In the above Formula 2, "$sk_{cam}$" denotes a signature key generated by the imaging apparatus 110.

The server apparatus 120 that has received the output data extracts the signature value (S) from the output data and calculates the secret information ($\alpha_0$) based on a verification key using a verification algorithm (Vrfy algorithm) corresponding to the Sign algorithm. Also, the server apparatus 120 extracts secret sharing data from k sets of output data and calculates secret information ($\alpha_0$) based on the extracted secret sharing data. Then, the server apparatus 120 determines whether the secret information ($\alpha_0$) calculated based on the signature value (S) and the secret information ($\alpha_0$) calculated based on the secret sharing data match with one another. If the two sets of secret information match, the server apparatus 120 determines that signature verification has been successful. If the two sets of secret information do not match, the server apparatus 120 determines that signature verification has failed.

3. Data Recording System Hardware Configuration

Figure 4A:
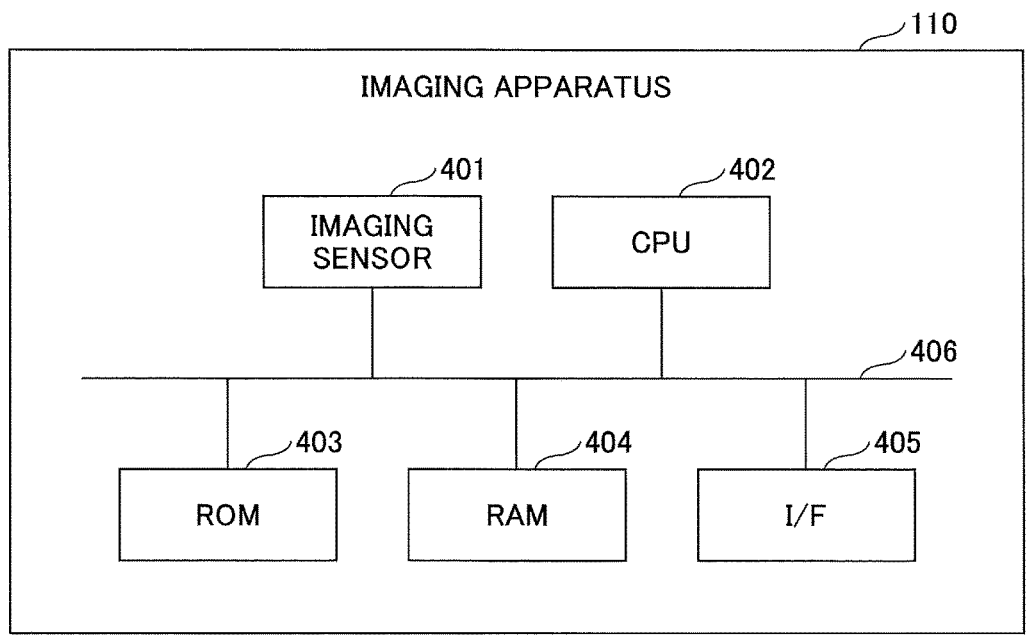
FIGS. 4A and 4B are diagrams respectively illustrating example hardware configurations of an imaging apparatus and a server apparatus according to the first embodiment.
Figure 4B:
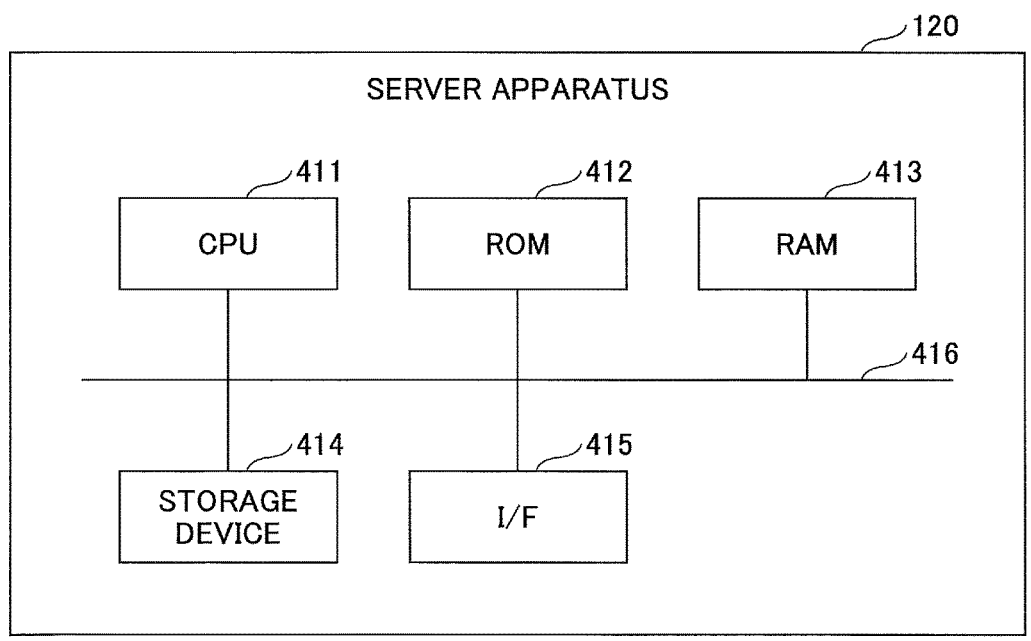

In the following, the hardware configuration of the imaging apparatus 110 and the server apparatus 120 constituting the data recording system 100 will be described. FIGS. 4A and 4B are diagrams respectively illustrating example hardware configurations of the imaging apparatus 110 and the server apparatus 120 according to the first embodiment.

In FIG. 4A, the imaging apparatus 110 includes an imaging sensor 401 and a CPU (Central Processing Unit) 402. Further, the imaging apparatus 110 includes a ROM (Read Only Memory) 403, a RAM (Random Access Memory) 404, and an I/F (Interface) 405. The above hardware components of the imaging apparatus 110 are connected to each other via a bus 406.

The image sensor 401 converts received light into an electric signal to generate moving image data. The CPU 402 is a computer that executes various programs (e.g., secret sharing data generation program) stored in the ROM 403.

The ROM 403 stores various programs to be executed by the CPU 402 and other programs and data used by the CPU 402 to execute the various programs. The RAM 404 provides a work area when the CPU 402 executes the various programs.

The I/F 405 is connected to a network and exchanges data with the server apparatus 120 via the network.

In FIG. 4B, the server apparatus 120 includes a CPU 411, a ROM 412, a RAM 413, a storage device 414, and an I/F 415. The above hardware components of the server apparatus 120 are connected to each other via a bus 416.

Note that the hardware configuration of the server apparatus 120 is substantially similar to the hardware configuration of the imaging apparatus 110. As such, only hardware features of the server apparatus 120 that differ from those of the imaging apparatus 110 will be described below. The hardware configuration of the server apparatus 120 differs from the hardware configuration of the imaging apparatus 110 in that it does not include the imaging sensor 401 but includes a storage device 414 as an additional hardware component.

The storage device 414 stores a data verification program, which is a program executed by the CPU 411, and output data transmitted from the imaging apparatus 110. In the server apparatus 120, the storage device 414 stores the data verification program is stored in the storage device 414, whereas the ROM 412 stores other programs used by the CPU 411 when the CPU 411 executes the data verification program. Also, the storage device 414 implements the data storage unit 122 that stores output data.

4. Imaging Apparatus Functional Configuration

In the following, a detailed functional configuration of the secret sharing data generation unit 111 implemented by the imaging apparatus 110 will be described. FIG. 5 is a diagram showing an example functional configuration of the imaging apparatus 110 according to the first embodiment.

In FIG. 5, the secret sharing data generation unit 111 includes a data input unit 501, a compression unit 502, a data buffer unit 503, a data counter unit 504, and a signature parameter generation unit 505. Also, the secret sharing data generation unit 111 includes a hash generation unit 506, a parameter information generation unit 507, a signature unit 508, an output data generation unit 509, and a data transmission unit 510.

The data input unit 501 acquires moving image data generated by the image sensor 401. The compression unit 502 compresses the acquired moving image data and generates unit data. The compression unit 502 may use any compression format, such as MPEG, Motion-JPEG, or H.264, to compress the acquired moving image data to generate unit data.

The data buffer unit 503 temporarily stores the unit data generated by the compression unit 502.

The data counter unit 504 counts the number of unit data stored in the data buffer unit 503, and whenever the number of unit data reaches a predetermined number (n), the data counter unit 504 notifies the signature parameter generation unit 505 and the signature unit 508 that the predetermined number (n) of unit data has been processed. Further, the data counter unit 504 counts the number of unit data stored in the data buffer unit 503 and notifies the output data generation unit 509 of the count value. Note that the data counter unit 504 resets the count value each time it counts the number of unit data up to the predetermined number (n).

The signature parameter generation unit 505 includes a random number generator, and upon receiving a notification from the data counter unit 504 that a predetermined number (n) of unit data has been processed, signature parameter generation unit 505 acquires k random number values generated by the random number generator as parameters ($\alpha_{k-1}$, $\alpha_{k-2}$, ... $\alpha_0$). Also, the signature parameter generation unit 505 notifies the parameter information generation unit 507 of the acquired parameters ($\alpha_{k-1}$, $\alpha_{k-2}$, ... $\alpha_0$). Further, the signature parameter generation unit 505 notifies the signature unit 508 of the parameter ($u_0$) as the secret information.

The hash generation unit 506 sequentially acquires unit data ($D_i$) from the unit data stored in the data buffer unit 503 and calculates a hash value (Hash($D_i$)) of the acquired unit data ($D_i$). Note that the hash generation unit 506 calculates the hash value of the unit data ($D_i$) in order to reduce the processing load of the imaging apparatus 110.

The parameter information generation unit 507 is an example of a calculation unit that calculates parameter information ($W_i$). The parameter information generation unit 507 acquires the hash value (Hash($D_i$)) calculated by the hash generation unit 506 and the parameters ($\alpha_{k-1}$, $\alpha_{k-2}$, ... $\alpha_0$) acquired by the signature parameter generation unit 505. Further, the parameter information generation unit 507 calculates parameter information ($W_i$) based on the acquired hash value and parameters using the above Formula 1.

The signature unit 508 is an example of a generation unit. Upon receiving notification from the data counter unit 504 that the predetermined number (n) of unit data has been processed, the signature unit 508 generates a signature value (S) using the secret information ($\alpha_0$) output by the signature parameter generation unit 505. Note that although the Sign algorithm is used to generate that signature value (S) in the present embodiment, the signing algorithm used to generate the signature value (S) is not limited to the above Sign algorithm. For example, the RSA algorithm, the RSASSA-PSS algorithm, or the ElGamal algorithm may also be used to generate the signature value (S).

The output data generation unit 509 is an example of an output unit. The output data generating unit 509 correlates the unit data ($D_i$) with the parameter information ($W_i$) to generate secret sharing data ($D_i$, $W_i$) each time it receives a notification of a count value (i) from the data counter unit 504. Also, the output data generation unit 509 generates output data ($D_i$, $W_i$, S) by adding the signature value (S) to the generated secret sharing data.

Also, the output data generation unit 509 packetizes the generated output data ($D_i$, $W_i$, S) and outputs the packetized data. The packet format used to packetize the secret sharing data may be determined based on the transmission format used for transmitting data. For example, when a network interface format is used as the transmission format, the RTSP (Real Time Streaming Protocol) format or the UDP (User Datagram Protocol) format may be used as the packet format. When a USB interface format is used as the transmission format, the isochronous packet may be used as the packet format, for example.

The data transmission unit 510 transmits the output data ($D_i$, $W_i$, S) that has been packetized by the output data generation unit 509. Note that the data transmission unit 510 streams the packetized output data ($D_i$, $W_i$, S) to the server apparatus 120 using a connectionless protocol, for example.

FIG. 6 is a diagram schematically illustrating process operations the data buffer unit 503, the hash generation unit 506, the parameter information generation unit 507, and the signature unit 508 of the imaging apparatus 110 according to the first embodiment. In the example of FIG. 6, the predetermined number n is set to "10" and k is set to "5".

In FIG. 6, when the hash generation unit 506 acquires unit data $D_1$ stored in the data buffer unit 503, the hash generation unit 506 calculates a hash value (Hash($D_1$)) of the acquired unit data $D_i$.

Also, the parameter information generation unit 507 acquires the hash value (Hash($D_1$)) calculated by the hash generating unit 506 and parameters ($\alpha 4$, $\alpha 3$, ... $\alpha_0$) output by the signature parameter generation unit 505. Further, the parameter information generation unit 507 calculates parameter information ($W_1$) based on the hash value (Hash($D_1$)) and the parameters ($\alpha 4$, $\alpha 3$, ... $\alpha_0$) and outputs the calculated parameter information.

Note that the above-described processes are similarly executed with respect to each of the other sets of unit data ($D_2$, $D_3$, ... $D_{10}$) stored in the data buffer unit 503, and as a result, the parameter information generation unit 507 outputs parameter information ($W_2$, $W_3$, ... $W_{10}$).

On the other hand, the signature unit 508 generates a signature value (S) using the secret information ($\alpha_0$) output by the signature parameter generation unit 505.

The output data generation unit 509 associates the unit data ($D_1$, $D_2$, ... $D_{10}$) stored in the data buffer unit 503 with the parameter information ($W_1$, $W_2$, ... $W_{10}$) output by the parameter information generation unit 507 to generate secret sharing data (($D_1$, $W_1$), ($D_2$, $W_2$), ... ($D_{10}$, $W_{10}$)).

Further, the output data generation unit 509 adds the signature value (S) calculated by the signature unit 508 to each set of the secret sharing data (($D_1$, $W_1$), ($D_2$, $W_2$), ... ($D_{10}$, $W_{10}$)) to generate output data (($D_1$, $W_1$, S), ($D_2$, $W_2$, S), ($D_{10}$, $W_{10}$, S)).

By implementing the above-described processes of the of the data buffer unit 503, the hash generation unit 506, the parameter information generation unit 507, and the signature unit 508 of the imaging apparatus 110, output data (secret sharing data, signature value) based on moving image data that has been generated can be output by the output data generation unit 509.

5. Structure of Output Data

Figures 7A, 7B:
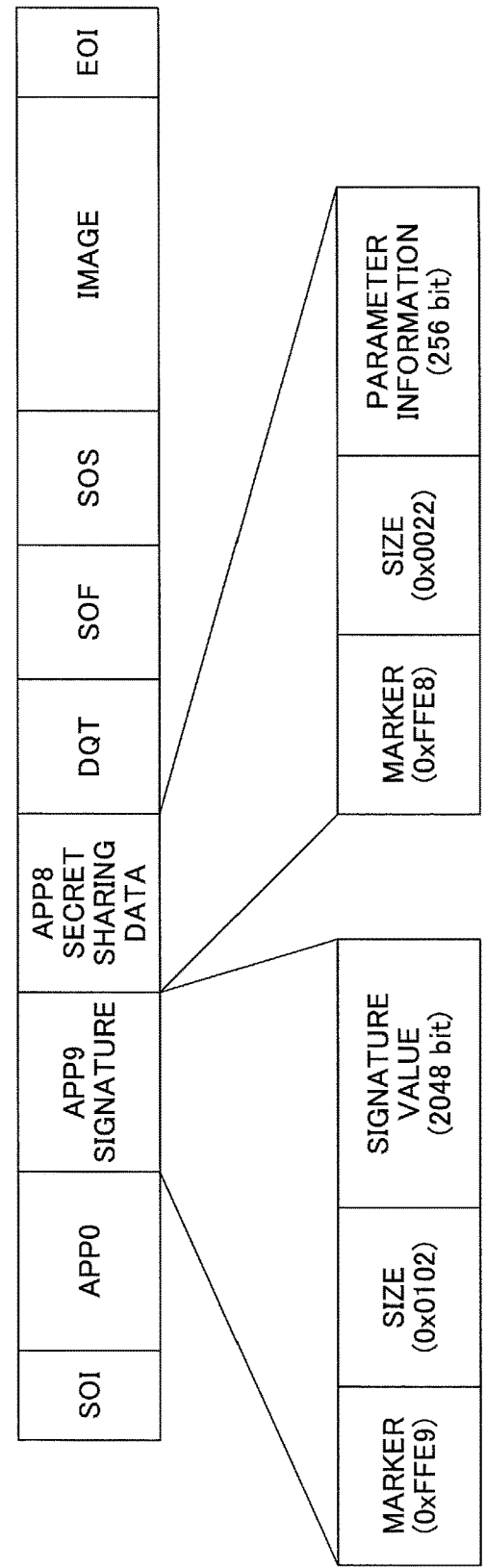
FIGS. 7A and 7B are diagrams illustrating an example data structure of output data.

In the following, the data structure of the output data generated by the output data generation unit 509 will be described. FIGS. 7A and 7B are diagrams illustrating an example data structure of output data.

In general, moving image data may be arranged into various data formats, such as MPEG, Motion-JPEG, H.264, and H.265. Each format has a specification enabling addition of an area for defining unique fields. In the present embodiment, it is assumed that Motion-JPEG is used as the data format for the moving image data. However, the moving image data may also be arranged in other formats, such as H.264 or H.265, for example. In the following, the data structure of the JPEG format will be described as an example data structure of output data. However, it may be assumed that output data may be generated in a similar manner even when a format other than Motion-JPEG is used.

FIG. 7A schematically illustrates the JPEG format. As illustrated in FIG. 7A, the JPEG format handles each data area between an SOI (Start of Image) and an EOI (End of Image) as one unit of data (unit data ($D_i$)). The data areas between the SOI and the EOI include a plurality of areas referred to as segments (APP0, DQT, SOF, SOS, etc.) and an image area.

Note that a segment called "APPn" can be added to the JPEG format. "APP" stands for Application Data, and "n" may be an integer from 0 to 15.

That is, in the case of using the JPEG format, 16 segments from APP0 to APP15 can be added to define application-specific fields. Note that a field to be defined by the APP segment is not particularly limited. However, segments APP0 and APP1 are usually reserved for particular purposes, and as such, 14 segments from APP2 to APP15 may generally be used to define application-specific fields.

In the present embodiment, segments APP8 and APPS of the segments from APP2 to APP15 are used to embed the signature value (S) and the parameter information ($W_i$).

FIG. 7B illustrates how the signature value (S) and the parameter information ($W_i$) are embedded. As illustrated in FIG. 7B, in the present embodiment, the parameter information ($W_i$) is embedded in the segment APP8, and the signature value (S) is embedded in the segment APP9.

By embedding the parameter information ($W_i$) and the signature value (S) in association with one set of data (unit data ($D_i$)) as described above, output data including the one set of data (unit data ($D_i$)), the parameter information ($W_i$), and the signature value (S) may be output.

Note FIG. 7B merely illustrates one example embedding method, and output data including the one set of data (unit data ($D_i$)), the parameter information ($W_i$) may be generated using other embedding methods as well.

For example, in the example of FIG. 7B, the compression unit 502 generates unit data ($D_i$) in the format as illustrated in FIG. 7A, the output data generation unit 509 adds the segments APP8 and APP9 to embed the parameter information ($W_i$) and the signature value (S). However, in other examples, the compression unit 502 may generate unit data ($D_i$) in a format including segments APP8 and APP9 in advance. Further, the output data generation unit 509 may embed the parameter information ($W_i$) and the signature value (S) in the segments APP8 and APP9. In this case, the compression unit 502 may embed the value "0" in the segments APP8 and APP9 upon generating the unit data ($D_i$). Alternatively, the compression unit 502 may generate the unit data ($D_i$) with the signature value (S) embedded in the segment APP9 in advance, for example.

Also, in the example of FIG. 7B, one set of data as illustrated in FIG. 7A is processed as the unit data ($D_i$). However, in other examples, only the "image" portion of the data illustrated in FIG. 7A may be processed as the unit data ($D_i$). In this case, data authenticity may be guaranteed only with respect to the "image" portion corresponding to the unit data ($D_i$), and the authenticity of the data other than the unit data ($D_i$) may not be guaranteed. For this reason, one set of data as illustrated in FIG. 7A is preferably processed as the unit data ($D_i$).

Also, note that although the parameter information ($W_i$) is embedded in the APP8 segment and the signature value (S) is embedded in the APP9 segment in the example of FIG. 7B, the parameter information ($W_i$) and the signature value (S) may also be embedded in other segments.

Further, although the APP8 segment having the parameter information ($W_i$) embedded therein and the APPS segment having the signature value (S) embedded therein are added after the APP0 segment in the example illustrated in FIG. 7B, the present invention is not limited thereto and segments may be added to at other positions.

By generating output data including one image (unit data ($D_i$)), parameter information ($W_i$), and a signature value (S) as described above, for example, the following advantageous effects may be achieved.

- As compared with a case of streaming the secret sharing data ($D_i$, $W_i$) using a connectionless protocol and streaming the signature value (S) using a connection-oriented protocol (i.e., separately transmitting the secret sharing data and the signature value), a connection-oriented port does not have to be separately provided at the imaging apparatus 110, and as such, a decrease in communication speed upon transmitting the secret sharing data may be controlled.
- As compared with a case of streaming the secret sharing data ($D_i$, $W_i$) using a connectionless protocol and streaming the signature value (S) using a connection-oriented protocol, the need for the data storage apparatus 120 to manage the relationship between the secret sharing data ($D_i$, $W_i$) and the signature value (S) may not be required.
- As compared with a case of streaming the secret sharing data ($D_i$, $W_i$) using a connectionless protocol and streaming the signature value (S) using a connection-oriented protocol, situations in which the data storage apparatus 120 is unable to receive the signature value (S) can be avoided. Also, the imaging apparatus 110 does not have to implement measures for retransmitting the signature value (S) in the case where the signature value (S) could not be received at the data storage apparatus 120, and as such, the imaging apparatus 110 does not have to temporarily hold the signature value (S) that is has already transmitted for a certain period of time. As a result, a storage does not have to be provided in the imaging apparatus 110 for holding the signature value (S) for a certain period of time and cost increase of the imaging apparatus 110 may be avoided.

As compared with a case of streaming the secret sharing data ($D_i$, $W_i$) using a connectionless protocol and streaming the signature value (S) using a connection-oriented protocol, implementation of broadcast transmission may be facilitated.

A special format does not have to be prepared, and output data may be generated using a standard format.

6. Data Transmission Process by Secret Sharing Data Generation Unit

In the following, a data transmission process implemented by the secret sharing data generation unit 111 according to the first embodiment will be described. FIG. 8 is a flowchart illustrating an example process flow of the data transmission process implemented by the secret sharing data generation unit 111 according to the first embodiment. The secret sharing data generation unit 111 executes the process of in FIG. 8 when generation of moving image data by the image sensor 401 is started.

In step S801, the data counter unit 504 substitutes "0" for the count value "i".

In step S802, the data input unit 501 acquires the moving image data generated by the image sensor 401. Also, the compression unit 502 compresses the acquired moving image data to generate unit data and stores the generated unit data ($D_i$) in the data buffer unit 503.

In step S803, the signature parameter generation unit 505 acquires k random numbers generated by the random number generator as parameters ($\alpha_{k-1}$, $\alpha_{k-2}$, ... $\alpha_0$).

In step S804, the signature unit 508 obtains the parameter ($\alpha_0$) acquired by the signature parameter generation unit 505 as secret information and adds a signature to the acquired secret information ($\alpha_0$) to thereby generate a signature value (S).

In step S805, the hash generation unit 506 acquires unit data ($D_i$) from the data buffer unit 503 and calculates a hash value (Hash($D_i$)).

In step S806, the parameter information generation unit 507 acquires the hash value (Hash($D_i$)) and the k parameters ($\alpha_{k-1}$, $\alpha_{k-2}$, ... $\alpha_0$). Also, the parameter information generation unit 507 calculates parameter information ($W_i$) using the acquired hash value (Hash($D_i$)) and the k parameters ($\alpha_{k-1}$, $\alpha_{k-2}$, ... $\alpha_0$).

In step S807, the output data generation unit 509 generates secret sharing data by associating the unit data (Di) stored in the data buffer unit 503 with the parameter information ($W_i$) calculated by the parameter information generation unit 507. Also, the output data generation unit 509 adds the signature value (S) calculated by the signature unit 508 to the generated secret sharing data to generate output data, packetizes the generated output data, and outputs the packetized output data to the data transmission unit 510. Further, the data transmission unit 510 streams the output data output by the output data generation unit 509 to the server apparatus 120 via a network.

In step S808, the data counter unit 504 determines whether a predetermined number (n) of unit data has been processed.

If it is determined in step S808 that the predetermined number (n) of unit data has not been processed, the process proceeds to step S809. In step S809, the data counter unit 504 increments the count value "i" to "i+1" and proceeds to step S810.

In step S810, when the next unit data ($D_i$) is stored in the data buffer unit 503, the process returns to step S805. In this way, the processes from steps S805 to S810 are repeated until output data streaming has been implemented with respect to the predetermined number (n) of unit data.

On the other hand, if it is determined in step S808 that the predetermined number (n) of unit data has been processed, the data counter unit 504 notifies the signature parameter generating unit 505 and the signature unit 508 that the predetermined number (n) of unit data has been processed and proceeds to step S811.

In step S811, it is determined whether the data transmission process should be ended. If the input of moving image data generated by the image sensor 401 is continuing, the data transmission process is not ended, and the process returns to step S801. In this case, the count value "i" is reset to "0" by the data counter unit 504 (step S801), the signature parameter generation unit 505 newly acquires k parameters (step S803), and the signature unit 508 generates a new signature value (S) (step S804). In this way, output data streaming is implemented with respect to the next predetermined number (n) of unit data.

On the other hand, if it is determined that input of moving image data has stopped, the data transmission process is ended.

7. Server Apparatus Functional Configuration

In the following, a detailed functional configuration of the data verification unit 121 of the server apparatus 120 will be described. FIG. 9 is a diagram illustrating an example functional configuration of the server apparatus 120 according to the first embodiment.

In FIG. 9, the data verification unit 121 includes a data receiving unit 901, a storage process unit 902, a signature value extraction unit 903, a secret sharing data extraction unit 904, a signature value calculation unit 905, and a signature value verification unit 906.

The data receiving unit 901 is an example of a receiving unit that receives output data transmitted from the imaging apparatus 110. The output data includes secret sharing data, which is a combination of unit data ($D_i$) and parameter information ($W_i$) associated with the unit data, and a signature value (S) that is added to the secret sharing data.

The storage process unit 902 stores the output data received by the data receiving unit 901 in the data storage unit 122.

The signature value extraction unit 903 reads a set of output data stored in the data storage unit 122 and extracts the signature value (S) included in the read output data. Also, the signature value extraction unit 903 notifies the signature value verification unit 906 of the extracted signature value (S).

The secret sharing data extraction unit 904 is an example of a first tampering determination unit that determines whether signature verification has been successful. The secret sharing data extraction unit 904 determines whether k or more sets of output data are stored in the data storage unit 122. When it is determined that the number of sets of output data stored in the data storage unit 122 is less than k, the secret sharing data extraction unit 904 determines that signature verification has failed.

If it is determined that k or more sets of output data are stored in the data storage unit 122, the secret sharing data extraction unit 904 reads the k sets of output data from the data storage unit 122 and acquires k sets of secret sharing data. Further, the secret sharing data extraction unit 904 notifies the signature value calculation unit 905 of the extracted k sets of secret sharing data.

The signature value calculation unit 905 is an example of a first calculation unit that calculates secret information ($\alpha_0$) based on the k sets of secret sharing data acquired from the secret sharing data extraction unit 904 using the following Formula 3, and notifies the signature value verification unit 906 of the calculated secret information ($\alpha_0$).

$$\alpha_0 = \Sigma_{(p=1-k)} W_{ip} \Pi_{(0 \leq q \leq k, q \neq p)} \text{Hash}(D_{iq})/(\text{Hash}(D_{iq}) - \text{Hash}(D_{ip})) \quad \text{(Formula 3)}$$

The signature value verification unit 906 is an example of a second calculation unit that calculates secret information ($\alpha_0$) based on a verification key $vk_{cam}$ using a verification algorithm (Vrfy algorithm) as represented by the following Formula 4 upon receiving the signature value (S) from the signature value extraction unit 903.

$$\text{Vrfy}(S, vk_{cam}) = \alpha_0 \quad \text{(Formula 4)}$$

The signature value verification unit 906 is also an example of a second tampering determination unit that determines whether signature verification has been successful by comparing the secret information ($\alpha_0$) acquired from the signature value calculation unit 905 and the secret information ($\alpha_0$) calculated based on the signature value (S) acquired from the signature value extraction unit 903 using the Vrfy algorithm. If it is determined from the comparison that the two sets of secret information ($\alpha_0$) match, the signature value verification unit 906 determines that the signature verification has been successful (i.e., the secret sharing data has not been tampered with). On the other hand, if the two sets of secret information ($\alpha_0$) do not match, the signature value verification unit 906 determines that the signature verification has failed (i.e., the secret sharing data has been tampered with).

Note that the signature verification determination results of the determination processes implemented by the secret sharing data extraction unit 904 and the signature value verification unit 906 may be stored in the data storage unit 122, for example. In this way, the server apparatus 120 may be able to stream to an external terminal, only the unit data included in the secret sharing data that has been successfully verified by the signature verification. As a result, only moving image data that is guaranteed to be authentic can be replayed at the external terminal (e.g., information terminal connected via a network).

8. Data Verification Process by Data Verification Unit

Figure 10:
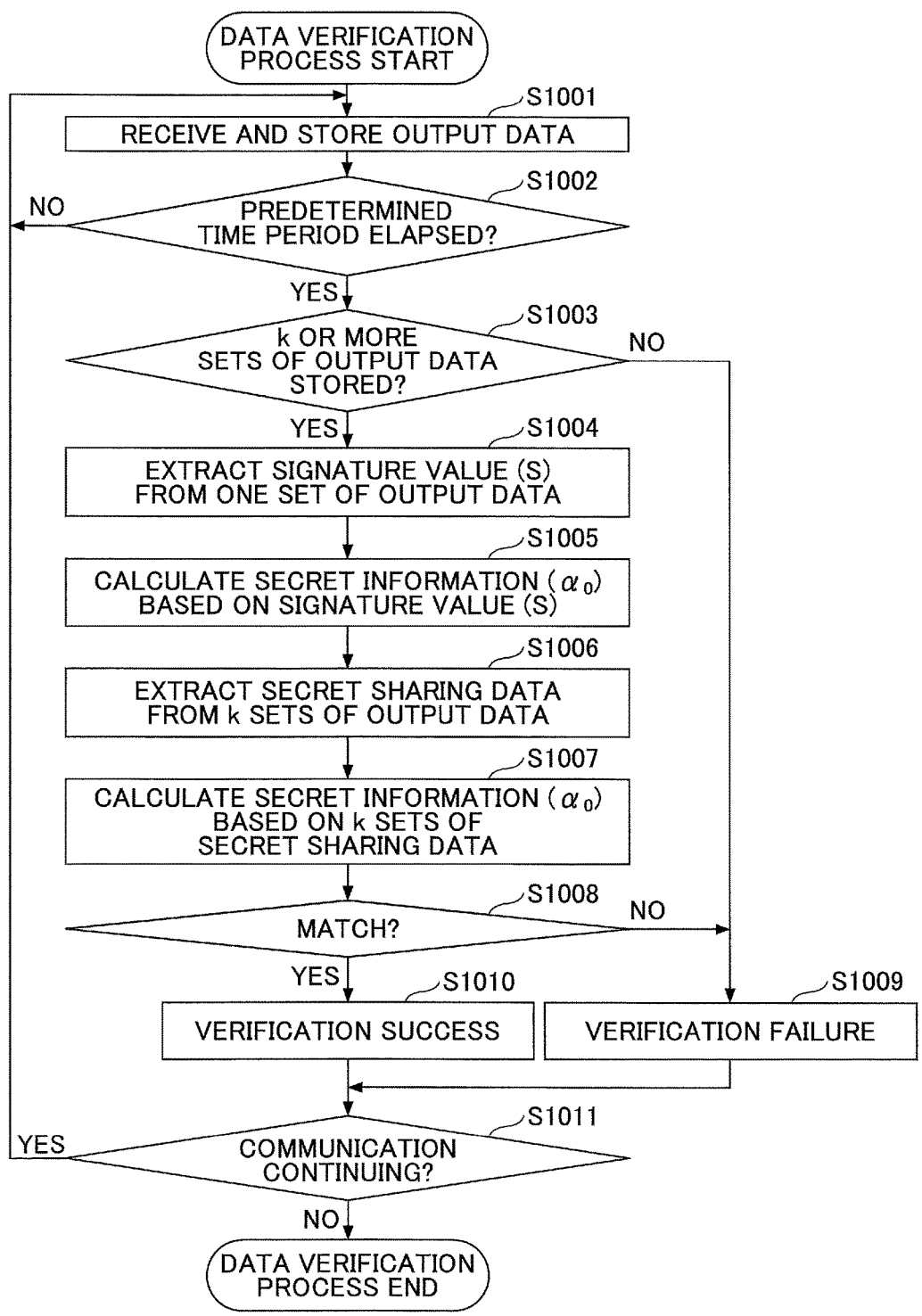
FIG. 10 is a flowchart illustrating an example process flow of a data verification process according to the first embodiment.

In the following, a data verification process implemented by the data verification unit 121 according to the first embodiment will be described. FIG. 10 is a flowchart illustrating an example process flow of the data verification process implemented by the data verification unit 121 according to the first embodiment. The process of FIG. 10 is executed when the server apparatus 120 is communicably connected to the imaging apparatus 110.

In step S1001, the data receiving unit 901 receives the output data transmitted from the imaging apparatus 110. Also, the storage process unit 902 stores the output data received by the data receiving unit 901 in the data storage unit 122.

In step S1002, the data receiving unit 901 determines whether a predetermined time period has elapsed. If it is determined in step S1002 that the predetermined time period has not elapsed, the process returns to step S1001.

On the other hand, if it is determined in step S1002 that the predetermined time period has elapsed, the process proceeds to step S1003. In step S1003, the secret sharing data extraction unit 904 determines whether k or more sets of output data are stored in the data storage unit 122.

If it is determined in step S1003 that k or more sets of output data are not stored in the data storage unit 122, the process proceeds to step S1009. In step S1009, the secret sharing data extraction unit 904 determines that signature verification has failed.

On the other hand, if it is determined in step S1003 that k or more sets of output data are stored in the data storage unit 122, the process proceeds to step S1004. In step S1004, the signature value extraction unit 903 reads a set of output data stored in the data storage unit 122, extracts the signature value (S) from the read output data, and outputs the extracted signature value (S) to the signature value verification unit 906.

Upon receiving the signature value (S) from the signature value extraction unit 903, in step S1005, the signature value verification unit 906 calculates secret information ($\alpha_0$) based on the verification key $vk_{cam}$ using the Vrfy algorithm (Formula 4).

In step S1006, the secret sharing data extraction unit 904 reads k sets of output data from the data storage unit 122, extracts k sets of secret sharing data included in the read output data, and transmits the extracted k sets of secret sharing data to the signature value calculation unit 905.

In step S1007, the signature value calculation unit 905 calculates secret information ($\alpha_0$) using the above Formula 3 upon receiving the k sets of secret sharing data from the secret sharing data extraction unit 904 and transmits the calculated secret information ($\alpha_0$) to the signature value verification unit 906.

In step S1008, the signature value verification unit 906 compares the secret information ($\alpha_0$) acquired from the signature value calculation unit 905 with the secret information ($\alpha_0$) calculated based on the signature value (S) using the Vrfy algorithm. If it is determined from the comparison in step S1008 that the two sets of secret information to not match, the process proceeds to step S1009 where it is determined that signature verification has failed (i.e., the secret sharing data has been tampered with).

On the other hand, if it is determined from the comparison in step S1008, that the two sets of secret information match, the process proceeds to step S1010 where it is determined that signature verification has been successful (i.e., the secret sharing data has not been tampered with).

In step S1011, the data receiving unit 901 determines whether communication with the imaging apparatus 110 is continuing. If it is determined that the communication is continuing, the data receiving unit 901 returns to step S1001. On the other hand, if it is determined that the communication has been disconnected, signature verification is performed with respect to secret sharing data included in output data already stored in the data storage unit 122 that has not yet been processed. Then, the data verification process is ended.

9. Application Example

Figure 11:
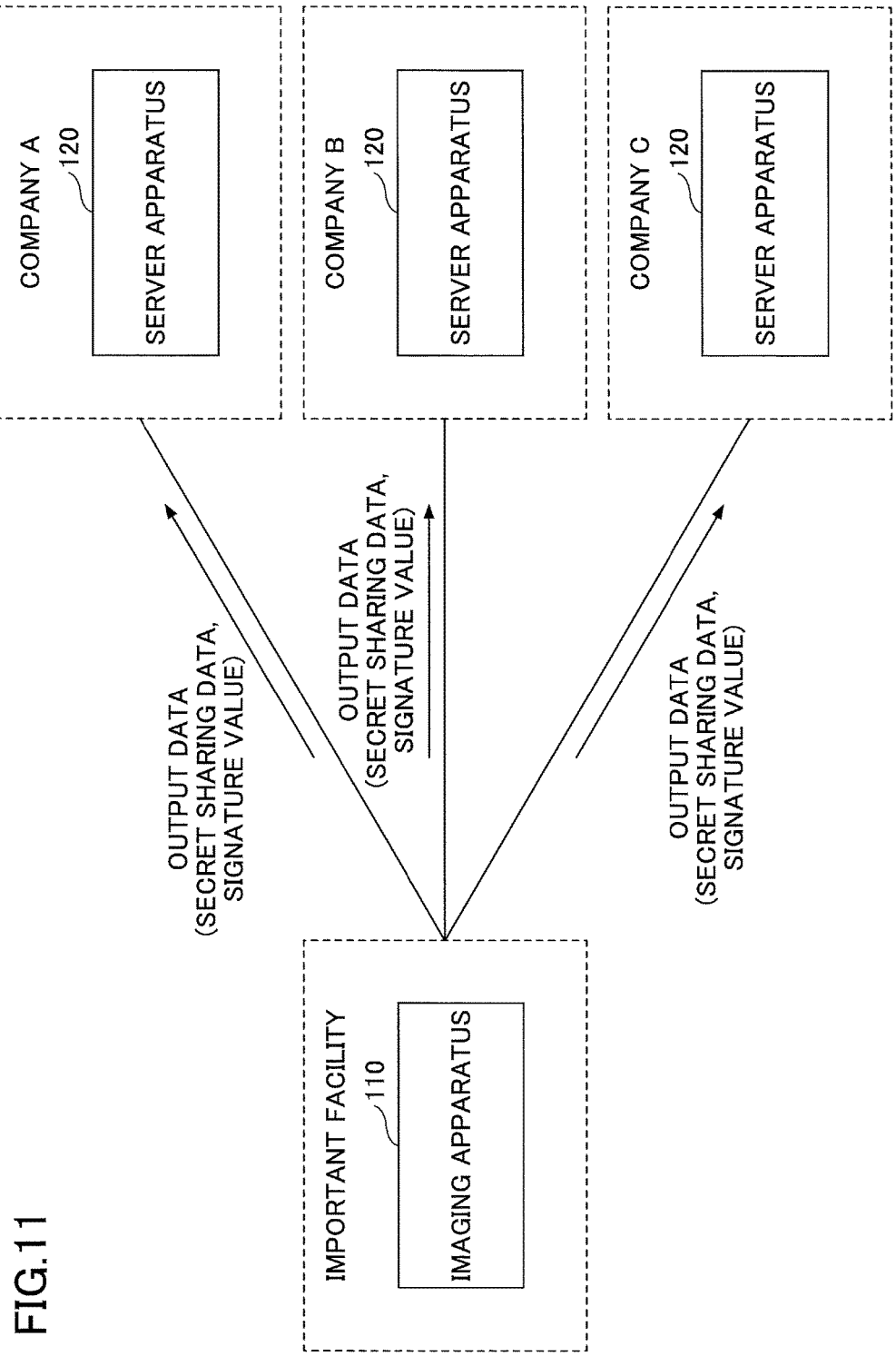
FIG. 11 is a diagram illustrating an application example of the data recording system.

In the following, an application example of the data recording system 100 will be described. FIG. 11 is a diagram illustrating an application example of the data recording system 100. In the example of FIG. 11, the imaging apparatus 110 according to the first embodiment is installed in an important facility, such as a nuclear power plant, and the server apparatus 120 is installed in each of a plurality of companies (company A to company C).

Because an important facility such as a nuclear power plant operates 24 hours, the imaging apparatus 110 installed in the facility needs to continuously stream moving image data that is guaranteed to be authentic 24 hours.

Because the processing load of the imaging apparatus 110 according to the first embodiment is relatively low, the imaging apparatus 110 may be suitably applied to such facility to adequately satisfy the above needs. That is, the imaging apparatus 110 according to the first embodiment merely adds a signature to secret information ($\alpha_0$) rather than adding a signature to unit data, and as such, the processing load required for adding the signature may be relatively low. Further, the imaging apparatus 110 according to the first embodiment generates parameter information by hashing the unit data, and as such, the processing load required for processing the unit data may be relatively low.

Also, even when data loss occurs upon transmitting the output data (secret sharing data and signature value) as illustrated in FIG. 11, the server apparatus 120 at each company may be able to perform signature verification to guarantee authenticity of the moving image data. Also, because the output data is broadcast to a plurality of companies, situations may be avoided where a specific company attempts to tamper with the moving image data that has been guaranteed to be authentic, for example.

As can be appreciated from the above descriptions, in the data recording system 100 according to the present embodiment, the following features are implemented.

The imaging apparatus 110 successively acquires n sets of unit data ($D_i$) from moving image data that has been generated and, based on the acquired unit data ($D_i$), the imaging apparatus 110 calculates parameter information ($W_i$) that satisfies a polynomial of degree (k−1) including k (1≤k<n) random numbers.

The imaging apparatus 110 generates a signature value (S) by adding a signature to secret information ($\alpha_0$) that can be calculated by acquiring k sets of secret sharing data.

The imaging apparatus 110 generates output data by adding the generated signature value (S) to secret sharing data, which is a combination of the acquired unit data ($D_i$) and the calculated parameter information ($W_i$), and outputs the generated output data to the server apparatus 120.

In this way, when the server apparatus 120 receives k sets of output data among the n sets of output data transmitted by the imaging apparatus 110, the server apparatus 120 may be able to calculate secret information ($\alpha_0$) based on the secret sharing data included in the k sets of output data. In other words, the data recording system 100 according to the present embodiment allows for data loss of (n-k) sets of data, and in this way, practicality may be improved in implementing measures for guaranteeing data authenticity.

Also, in the data recording system 100 according to the present embodiment, signature verification is performed by comparing the above secret information ($\alpha_0$) calculated based on the secret sharing data included in the k sets of output data with secret information ($\alpha_0$) calculated based on the signature value included in the output data to guarantee the authenticity of the secret sharing data. In this way, as compared with the case of separately transmitting the signature value, influences from transmitting the signature value (decrease in communication speed, need for additional storage for holding the signature value, processing required for associating the secret sharing data with the signature value, etc.) can be reduced, and practicality can be improved, for example.

As described above, according to an aspect of the first embodiment, practicality can be improved in a data recording system that is capable of guaranteeing authenticity of data.

Second Embodiment

In the above-described first embodiment, a signature value is added to each set of secret sharing data when generating output data. However, a signature value does not necessarily have to be added to each set of secret sharing data. That is, in a case where the server apparatus 120 receives k or more sets of output data, at least one of the received output data sets has to include the signature value.

Thus, according to a second embodiment of the present invention, in generating the predetermined number (n) of output data sets, a signature value is not added to the first through (k−1)$^{th}$ set of output data, and a signature value is added to each set of output data after the (k)$^{th}$ set of output data to be output.

In this way, for example, the generation of the predetermined number (n) of output data sets and the generation of the signature value may be performed in parallel, and the generation of the signature value may only have to be completed by the time the (k−1)$^{th}$ set of output data is generated. As a result, situations may be avoided where generation of the first set of output data cannot be started until generation of the signature value is completed, for example, and potential delays in the generation of output data may be avoided. In the following, aspects and features of the second embodiment that differ from those of the first embodiment will be mainly described.

<1. Imaging Apparatus Functional Configuration>

Figure 12:
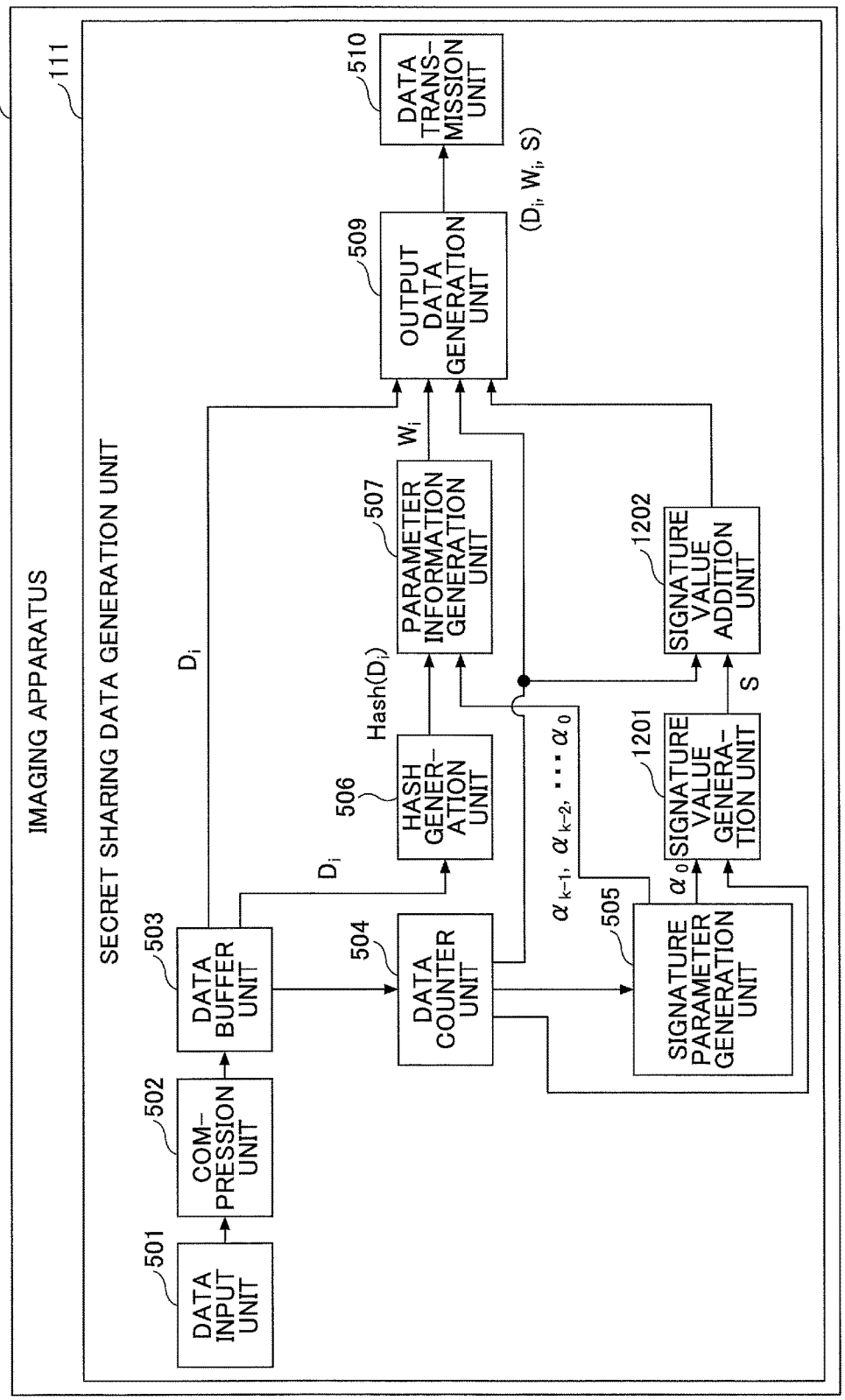
FIG. 12 is a diagram illustrating an example functional configuration of the imaging apparatus according to a second embodiment of the present invention.

In the following, the functional configuration of the imaging apparatus 110 according to the second embodiment will be described. FIG. 12 is a diagram illustrating an example functional configuration of the imaging apparatus 110 according to the second embodiment. The functional configuration illustrated in FIG. 12 differs from that illustrated in FIG. 5 in that it includes a signature value generation unit 1201 and a signature value addition unit 1202 instead of the signature unit 508.

The signature value generation unit 1201 generates a signature value (S) using secret information ($\alpha_0$) output by the signature parameter generation unit 505 upon receiving a notification from the data counter unit 504 that the predetermined number (n) of unit data sets have been processed. The signature value generation unit 1201 notifies the signature value addition unit 1202 of the generated signature value (S).

Upon receiving the signature value (S) from the signature value generation unit 1201, the signature value addition unit 1202 monitors the parameter information generation unit 507 and determines whether the parameter information generation unit 507 has generated k$^{th}$ parameter information ($W_{k-1}$). Specifically, the signature value addition unit 1202 acquires the count value i of the data counter unit 504 and determines whether the count value i has reached (k−1). If it is determined that the parameter information generation unit 507 has not generated the k$^{th}$ parameter information ($W_{k-1}$) (when the count value i is less than (k−1)), the signature value addition unit 1202 waits until the parameter information generation unit 507 has generated the k$^{th}$ parameter information ($W_{k-1}$). On the other hand, if it is determined that the parameter information generation unit 507 has generated the k$^{th}$ parameter information ($W_{k-1}$), the signature value addition unit 1202 thereafter notifies the output data generation unit 509 of the signature value (S) each time the parameter information generation unit 507 generates parameter information ($W_i$). Note that the signature value addition unit 1202 continues to notify the output data generation unit 509 of the signature value (S) until the parameter information generation unit 507 generates the $n^{th}$ parameter information ($W_{n-1}$).

In the case where the output data generation unit 509 does not receive notification of the signature value (S) upon receiving the parameter information ($W_i$), the output data generation unit 509 generates output data by associating the unit data ($D_i$) with the parameter information ($W_i$). On the other hand, in the case where the output data generation unit 509 receives notification of the signature value (S) upon receiving the parameter information ($W_i$), the output data generation unit 509 generates output data by adding the signature value (S) to secret sharing data including a combination of the unit data ($D_i$) and the parameter information ($W_i$).

<2. Signature Value Notification Timing>

Figure 13:
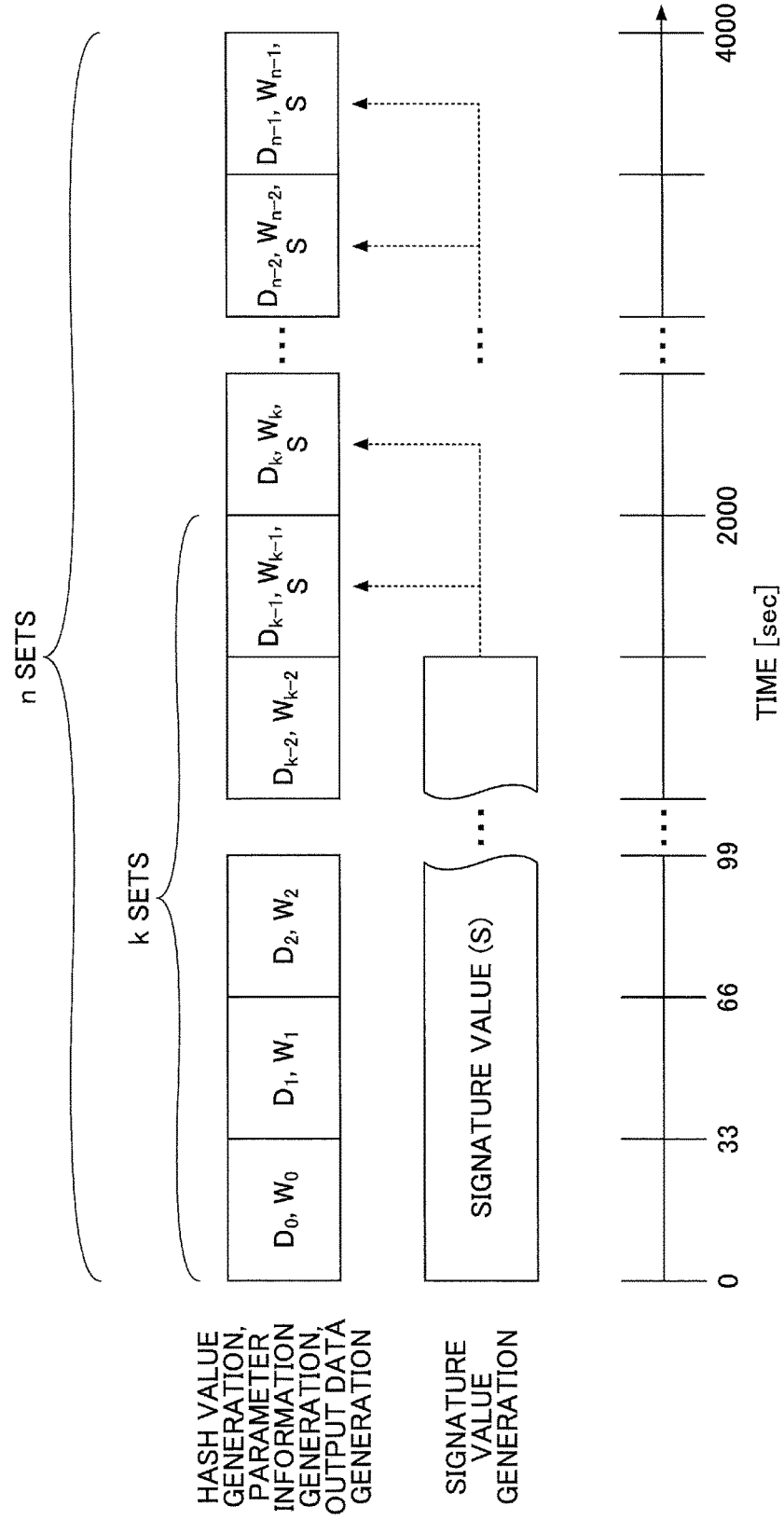
FIG. 13 is a diagram illustrating an example notification timing of a signature value.

In the following, the notification timing of the signature value (S) by the signature value addition unit 1202 will be described. FIG. 13 is a diagram illustrating example notification timings of the signature value.

In FIG. 13, generation of a hash value by the hash generation unit 506, generation of parameter information ($W_i$) by the parameter information generation unit 507, generation of output data by the output data generation unit 509, generation of a signature value (S) by the signature value generation unit 1201 are performed in parallel.

Specifically, generation of a hash value by the hash generation unit 506, generation of parameter information ($W_i$) by the parameter information generation unit 507, generation of output data by the output data generation unit 509, generation of a signature value (S) by the signature value generation unit 1201 are performed in parallel using a multi-thread function of the CPU 402. The signature value addition unit 1202 monitors the parameter information generation unit 507 and notifies the output data generating unit 509 of the signature value (S) at the time the $k^{th}$ parameter information ($W_{k-1}$) is generated by the parameter information generation unit 507. Thereafter, the signature value addition unit 1202 notifies the output data generation unit 509 of the signature value (S) each time parameter information ($W_i$) is generated.

As a result, as can be appreciated from FIG. 13, the signature value (S) is not added to the first to $(k-1)^{th}$ sets of output data, and the signature value (S) is added to the $k^{th}$ to $n^{th}$ sets of output data.

By adding the signature value (S) to the $k^{th}$ to $n^{th}$ sets of output data, the signature value verification unit 906 of the server apparatus 120 may be able to perform signature verification in a given case, such as the following example cases, for example.

In a case where the server apparatus 120 receives only the first to $(k-1)^{th}$ sets of output data, the signature value (S) is not included in any of the received sets of output data. In such a case, because secret information ($\alpha_0$) cannot be calculated from only (k-1) sets of secret sharing data, the signature value verification unit 906 cannot perform signature verification based on the signature value (S). That is, irrespective of whether the signature value (S) is included in the output data, the secret sharing data extraction unit 904 determines that signature verification has failed.

In a case where the server apparatus 120 receives the first to $k^{th}$ sets of output data, the signature value verification unit 906 can perform signature verification based on the signature value (S) included in the $k^{th}$ set of output data.

In a case where the server apparatus 120 receives the first to $(k-1)^{th}$ sets of output data and any one or more of the $(k+1)^{th}$ to $n^{th}$ sets of output data, the signature value verification unit 906 can perform signature verification based on the signature value (S) included in the one or more of the $(k+1)^{th}$ to $n^{th}$ sets of output data.

As can be appreciated from the above descriptions, by adding the signature value (S) to the $k^{th}$ to $n^{th}$ sets of output data, when the server apparatus 120 receives the k sets of output data, at least one set of the received output data sets will include a signature value (S). As a result, the signature value verification unit 906 of the server apparatus 120 will be able to perform signature verification using the signature value (S).

Also, according to an aspect of the present embodiment, the time during which the first to $(k-1)^{th}$ sets of output data are generated may be used by the signature value generation unit 1201 to generate the signature value (S). In this way, the following advantageous effects may be achieved, for example.

That is, in a case where the signature value (S) has to be included in the first set of output data, the output data generation unit 509 cannot generate the first set of output data until generation of the signature value (S) is completed. Assuming it takes several hundreds of milliseconds to generate the signature value (S), streaming of the output data will be delayed at a frequency of once per n times of output data generation. As a result, when output data is displayed on the server apparatus 120 in real time, image updating will be delayed once per n frames.

On the other hand, in the case where the signature value generation unit 1201 generates the signature value (S) using the time it takes to generate the first to $(k-1)^{th}$ sets of output data, such delay can be avoided.

Note that FIG. 13 illustrate an example case where output data is continuously streamed at a transmission rate of 30 [fps], and n=120 and k=60. In this case, it takes about 2000 milliseconds [msec] before the $k^{th}$ parameter information ($W_{k-1}$) is generated. As described above, it takes several hundreds of milliseconds [msec] to generate the signature value (S). Thus, in the example of FIG. 13, a situation where the generation of the signature value (S) causes a delay in the generation of the $k^{th}$ set of output data can be prevented.

<3. Data Transmission Processing by Secret Sharing Data Generation Unit>

Figure 14:
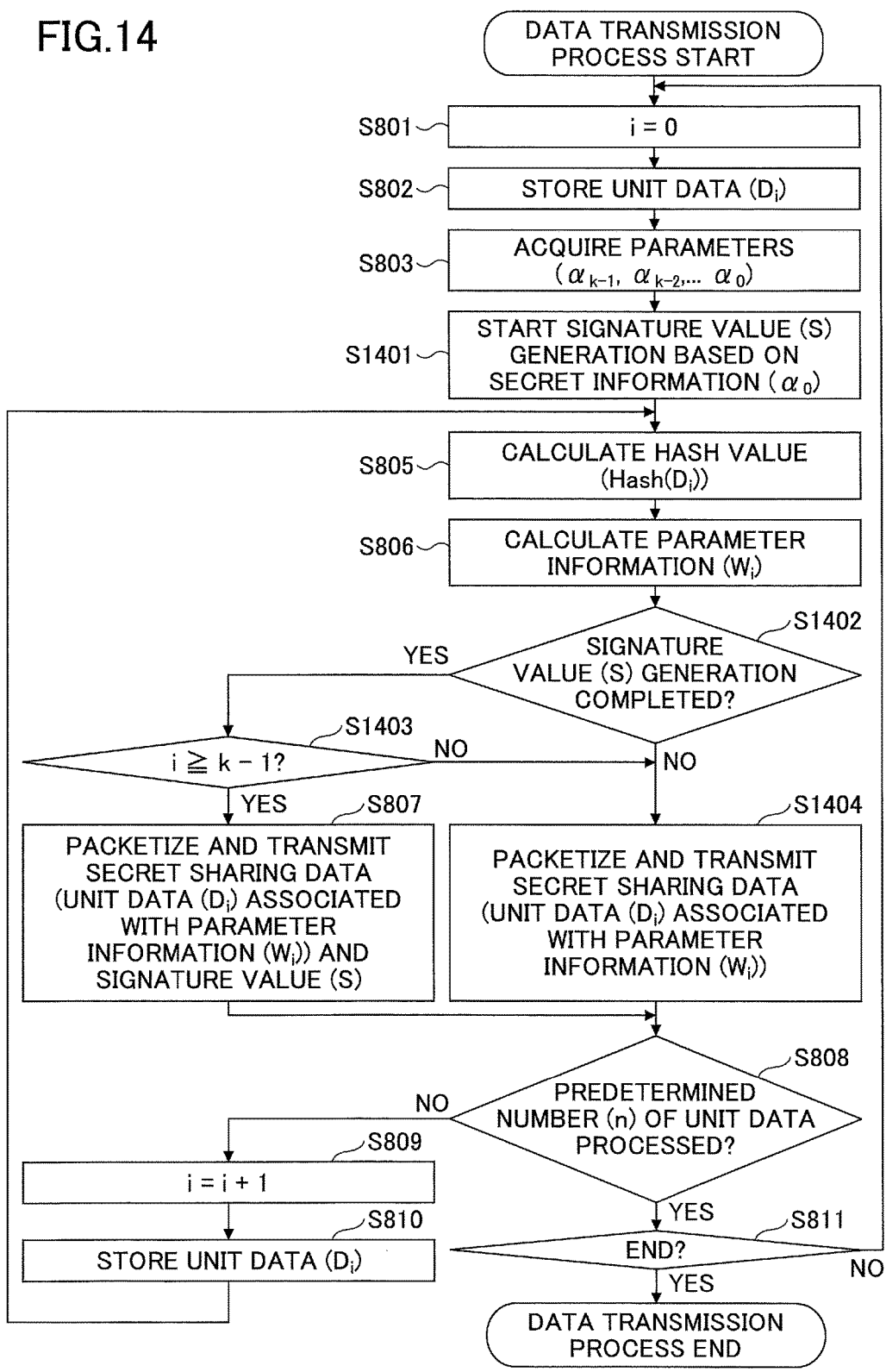
FIG. 14 is a flowchart illustrating an example process flow of the data transmission process according to the second embodiment.

In the following, the data transmission process implemented by the secret sharing data generation unit 111 according to the second embodiment will be described. FIG. 14 is a flowchart illustrating an example process flow of the data transmission process according to the second embodiment. Note that process steps of the data transmission process of FIG. 14 that are substantially identical to those of the data transmission process of FIG. 8 are given the same reference numerals and descriptions thereof will be omitted. The process of FIG. 14 differs from that of FIG. 8 in that it includes step S1401 in place of step S804, and additionally includes steps S1402 to S1404.

In step S1401, the signature value generation unit 1201 acquires the parameter (ad acquired by the signature parameter generation unit 505 as secret information, and starts the process of generating the signature value (S).

In step S1402, the signature value addition unit 1202 determines whether generation of the signature value (S) by the signature value generation unit 1201 has been completed.

If it is determined in step S1402 that the generation of the signature value (S) by the signature value generation unit 1201 is not yet completed, the process proceeds to step S1404.

On the other hand, if it is determined in step S1402 that the generation of the signature value (S) by the signature value generation unit 1201 has been completed, the process proceeds to step S1403.

In step S1403, the signature value addition unit 1202 monitors the parameter information generation unit 507 and determines whether the $k^{th}$ parameter information ($W_{k-1}$) has been generated.

In step S1403, if it is determined that the $k^{th}$ parameter information ($W_{k-1}$) has not been generated, the process proceeds to step S1404. In step S1404, the output data generation unit 509 generates secret sharing data by associating the unit data ($D_i$) stored in the data buffer unit 503 with the parameter information ($W_i$) output by the parameter information generation unit 507. Also, the output data generation unit 509 packetizes the generated secret sharing data as output data. Further, the data transmission unit 510 streams the output data packetized by the parameter information generation unit 507 to the server apparatus 120 via a network.

On the other hand, if it is determined in step S1403 that the $k^{th}$ parameter information ($W_{k-1}$) has been generated, the process proceeds to step S807. The process implemented in this case is the same as the process of step S807 in FIG. 8.

As can be appreciated from the above description, the data recording system according to the second embodiment implements the following features in addition to the features of the first embodiment.

The imaging apparatus 110 generates the signature value (S) in parallel with the calculation of the parameter information ($W_i$).

The imaging apparatus 110 adds the signature value (S) to secret sharing data when generating the $k^{th}$ and subsequent sets of output data.

According to an aspect of the second embodiment, a delay in streaming the output data may be avoided in addition to achieving the same advantageous effects as those of the first embodiment.

Third Embodiment

According to the second embodiment, the generation of the signature value (S) is performed in parallel with the calculation of the parameter information ($W_i$) in order to avoid a delay in streaming output data caused by the generation of the signature value (S). Also, the signature value (S) is added to secret sharing data in generating the $k^{th}$ and subsequent sets of output data.

According to a third embodiment of the present invention, measures are implemented to avoid a delay in the streaming of output data caused by a hashing process for calculating the hash value (Hash ($D_i$)) of the unit data ($D_i$). In the following, aspects and features of the third embodiment that differ from those of the second embodiment will be mainly described.

<1. Output Data Generation Timing>

Figure 15:
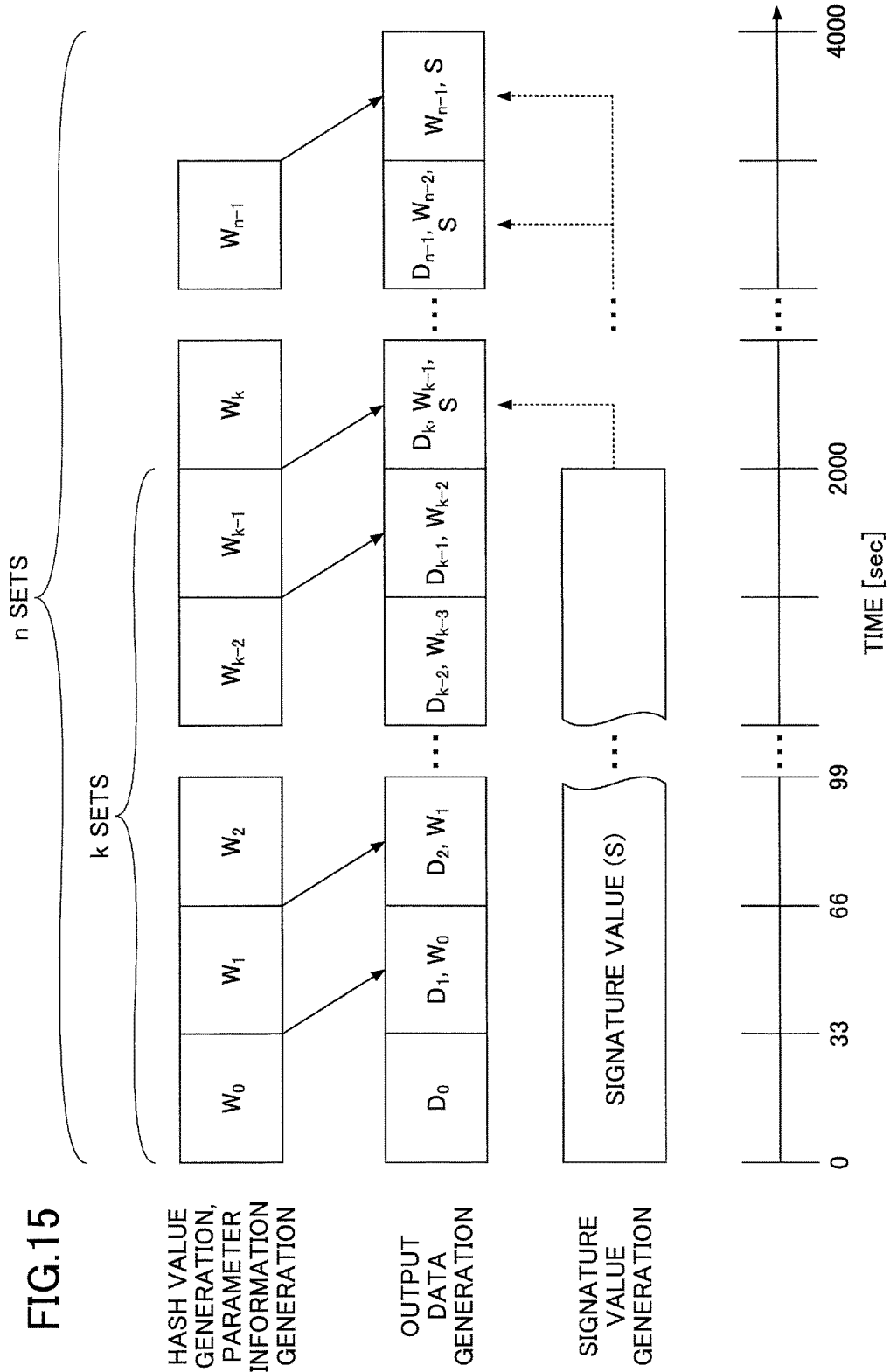
FIG. 15 is a diagram describing the generation timing of output data.

In the following, the generation timing of output data by the output data generation unit 509 according to the third embodiment will be described. FIG. 15 is a diagram illustrating the generation timing of output data.

In FIG. 15, the output data generation unit 509 starts generation of output data before the generation of parameter information ($W_i$) by the parameter information generation unit 507 is completed. To enable the parameter information generation unit 507 to generate the parameter information ($W_i$), first a hashing process is performed on the unit data ($D_i$) by the hash generation unit 506. As such, the time it takes for the parameter information generation unit 507 to notify the output data generation unit 509 of the parameter information ($W_i$) may be longer than the time it takes for the output data generation unit 509 to read the unit data ($D_i$) from the data buffer unit 503.

Thus, according to the third embodiment, the output data generation unit 509 generates the first set of output data without associating the parameter information ($W_i$) with the unit data ($D_i$). The output data generation unit 509 generates the second and subsequent sets of output data by associating parameter information ($W_{i-1}$) with unit data ($D_i$). In this way, the time required before streaming the first set of output data may be reduced.

<2. Data Transmission Process by Secret Sharing Data Generation Unit>

Figure 16:
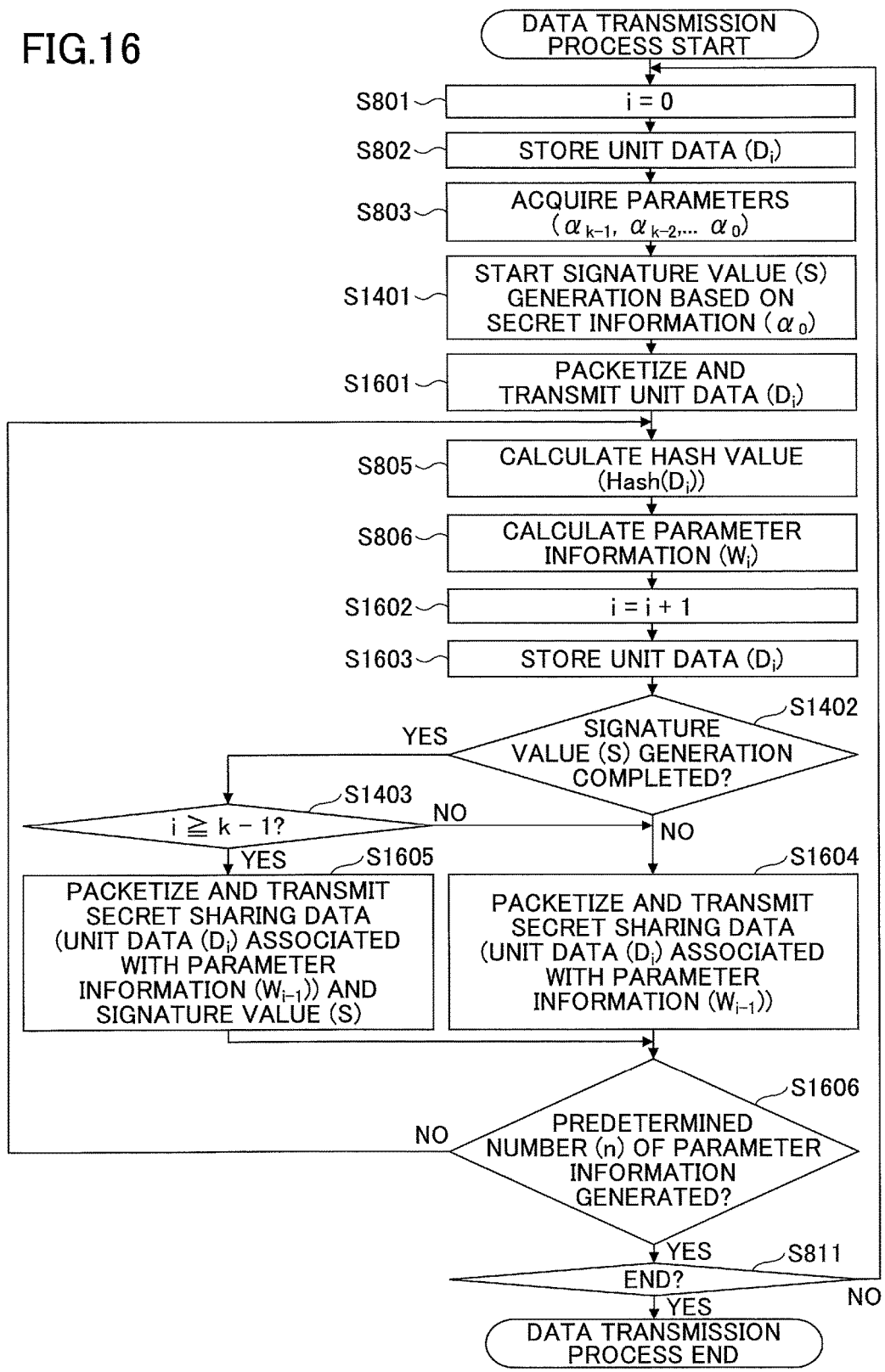
FIG. 16 is a flowchart illustrating an example process flow of the data transmission process according to a third embodiment of the present invention.

In the following, the data transmission process implemented by the secret sharing data generation unit 111 according to the third embodiment will be described. FIG. 16 is a flowchart illustrating an example process flow of the data transmission process according to the third embodiment. Note that process steps of the data transmission process of FIG. 16 that are substantially identical to those of FIG. 14 are given the same reference numerals and descriptions thereof will be omitted. The process of FIG. 16 differs from that of FIG. 14 in that it includes step S1601, steps S1602 to S1603, and steps S1604 to S1606.

In step S1601, the output data generation unit 509 acquires the unit data ($D_i$) from the data buffer unit 503, packetizes the acquired unit data ($D_i$) as output data, and outputs the packetized output data. Further, the data transmission unit 510 streams the output data output by the output data generation unit 509 to the server apparatus 120 via a network.

In step S1602, the data counter unit 504 increments the count value "i" to "i+1".

In step S1603, when the next unit data ($D_i$) is stored in the data buffer unit 503, the process proceeds to step S1402.

In step S1604, the output data generation unit 509 associates the unit data ($D_i$) stored in the data buffer unit 503 with the parameter information ($W_{i-1}$) generated by the parameter information generation unit 507 to thereby generate secret sharing data. Also, the output data generation unit 509 packetizes the generated secret sharing data as output data. Further, the data transmission unit 510 streams the output data packetized by the parameter information generation unit 507 to the server apparatus 120 via a network.

In step S1605, the output data generation unit 509 associates the unit data ($D_i$) stored in the data buffer unit 503 with the parameter information ($W_{i-1}$) generated by the parameter information generation unit 507 to generate secret sharing data. Also, the output data generation unit 509 adds the signature value (S) calculated by the signature unit 508 to the generated secret sharing data to generate output data, packetizes the generated output data, and outputs the packetized output data. Furthermore, the data transmission unit 510 streams the output data output by the output data generation unit 509 to the server apparatus 120 via a network.

In step S1606, the parameter information generation unit 507 determines whether the predetermined number (n) of parameter information sets have been generated.

If it is determined in step S1606 that the predetermined number (n) of parameter information sets have not been generated, the process returns to step S805. On the other hand, if it is determined in step S1606 that the predetermined number (n) of parameter information sets have been generated, the process proceeds to step S811.

<3. Server Apparatus Functional Configuration>

Figure 17:
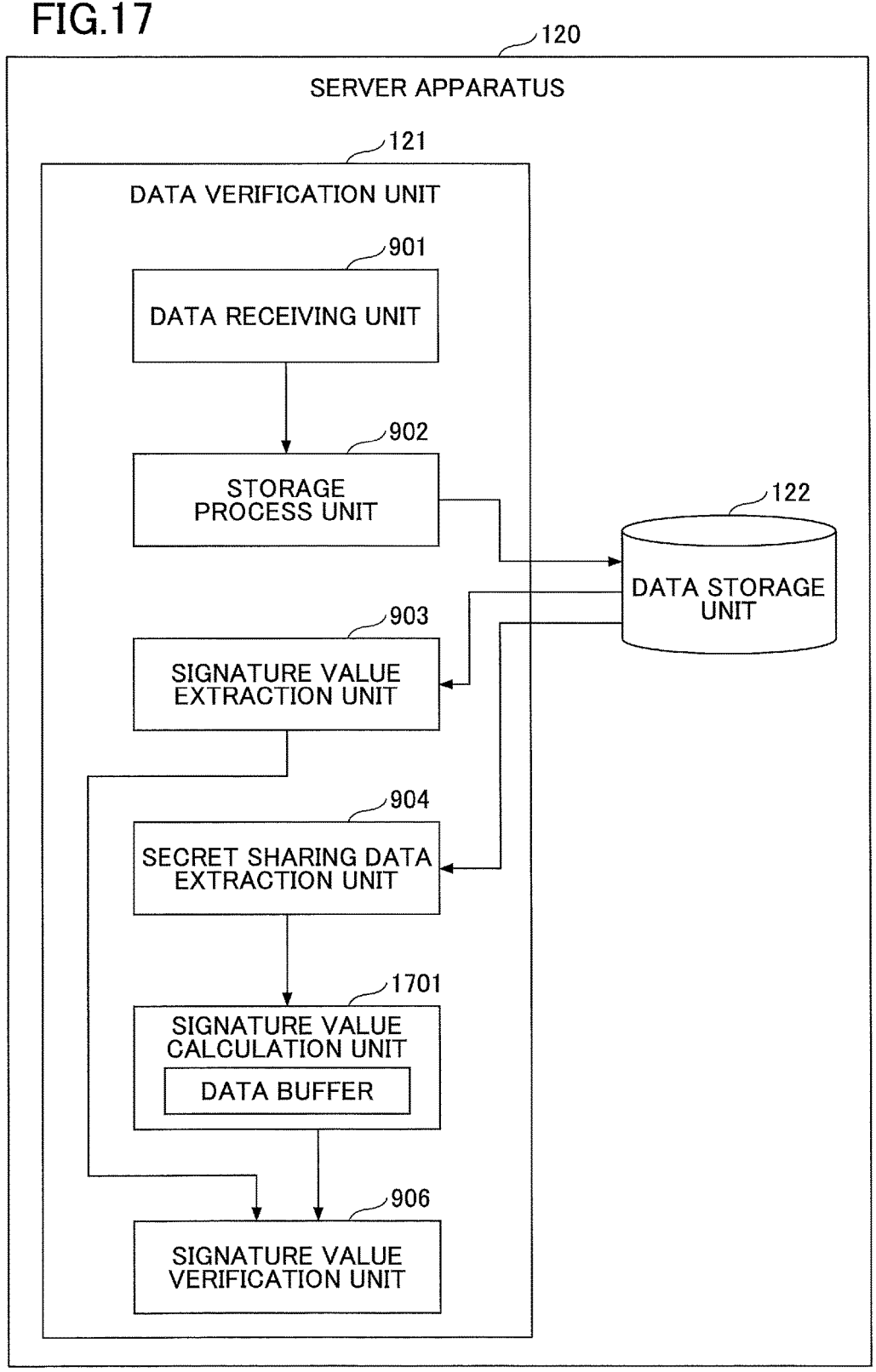
FIG. 17 is a diagram illustrating an example functional configuration of the server apparatus according to the third embodiment.

In the following, a detailed functional configuration of the data verification unit 121 of the server apparatus 120 will be described. FIG. 17 is a diagram illustrating an example functional configuration of the server apparatus 120 according to the third embodiment.

The functional configuration of the server apparatus 120 illustrated in FIG. 17 differs from the functional configuration illustrated in FIG. 9 in that it includes a signature value calculation unit 1701. As illustrated in FIG. 17, the signature value calculation unit 1701 includes a data buffer. In the third embodiment, the secret sharing data extracted from the output data received by the server apparatus 120 corresponds to a set of the $i^{th}$ unit data ($D_i$) and the $(i-1)^{th}$ parameter information ($W_{i-1}$), namely, ($D_i$, $W_{i-1}$). As such, the signature value calculation unit 1701 has to hold two consecutive sets of secret sharing data (($D_i$, $W_{i-1}$) and ($D_{i+1}$, $W_i$)) in the data buffer at the time of calculating the secret information ($\alpha_0$), to regenerate secret sharing data corresponding to a combination of the $i^{th}$ unit data ($D_i$) and the $i^{th}$ parameter information ($W_i$), namely, ($D_i$, $W_i$).

<4. Data Verification Process by Data Verification Unit>

Figure 18:
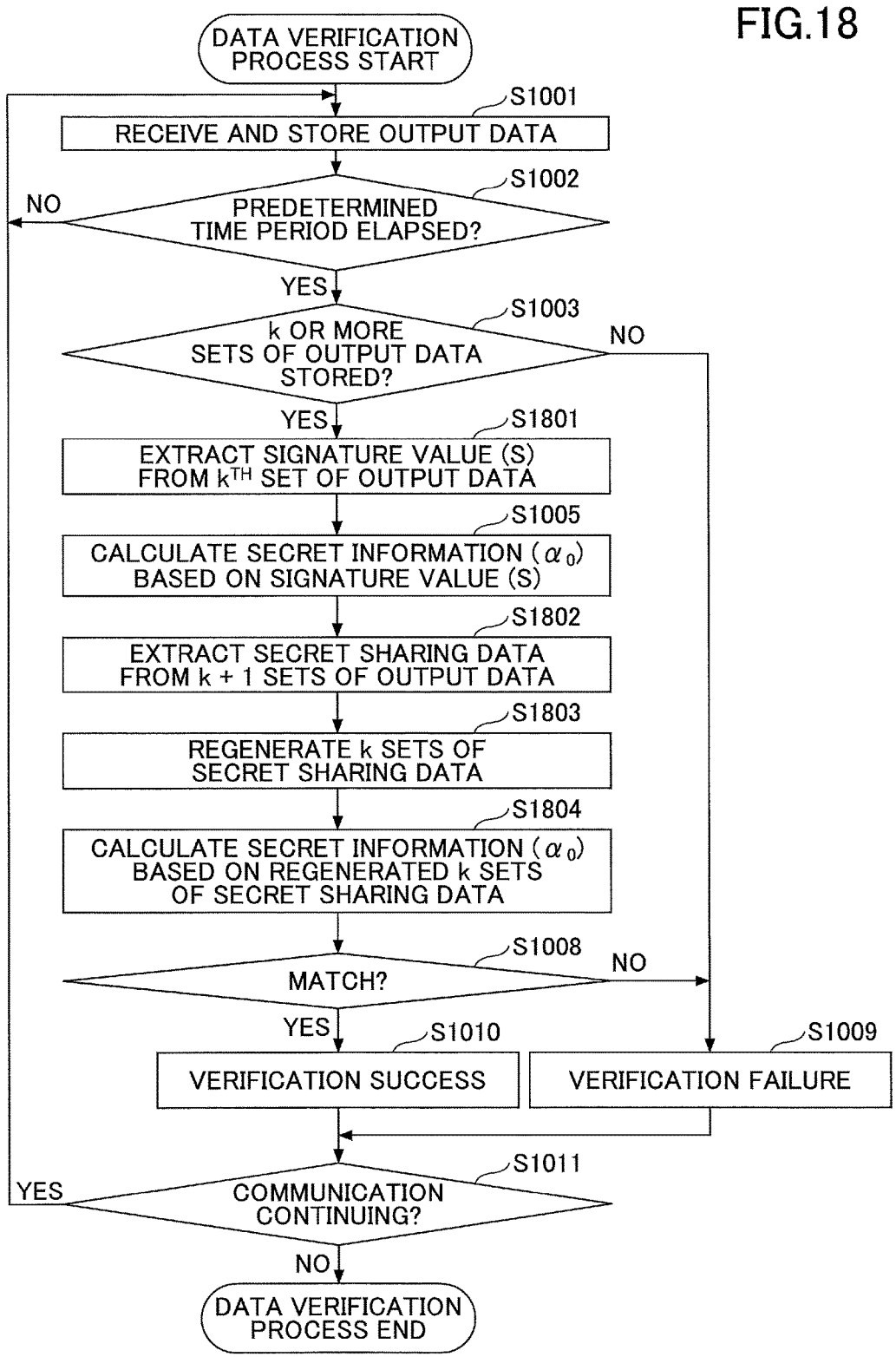
FIG. 18 is a flowchart illustrating an example process flow of the data verification process according to the third embodiment.

In the following, the data verification processing implemented by the data verification unit 121 according to the third embodiment will be described. FIG. 18 is a flowchart illustrating an example process flow of the data verification process according to the third embodiment. Note that process steps of the data verification process of FIG. 18 that are substantially identical to those of the data verification process of FIG. 10 are given the same reference numerals and descriptions thereof will be omitted. The process of FIG. 18 differs from the process of FIG. 10 in that it includes step S1801 and steps S1802 to S1804.

In step S1801, the signature value extraction unit 903 reads the $k^{th}$ set of output data (or any subsequent set of output data after the $k^{th}$ set of output data) from among the output data stored in the data storage unit 122, and extracts the signature value (S) included in the read output data.

In step S1802, the secret sharing data extraction unit 904 reads (k+1) sets of output data from the data storage unit 122. Also, the secret sharing data extraction unit 904 extracts one set of unit data ($D_0$) and k sets of secret sharing data ($D_1$1 $W_0$) to ($D_k$, $W_{k-1}$)) included in the read output data, and notifies the signature value calculation unit 905 of the extracted data.

In step S1803, upon receiving the unit data and the secret sharing data from the secret sharing data extraction unit 904, the signature value calculation unit 1701 regenerates k sets of secret sharing data based on successive sets of secret sharing data.

In step S1804, the signature value calculation unit 1701 calculates secret information ($\alpha_0$) based on the regenerated k sets of secret sharing data using the above Formula 3.

As can be appreciated from the above descriptions, the data recording system according to the third embodiment implements the following features in addition to the features of the second embodiment.

The imaging apparatus 110 generates the first set of output data before generating the first set of parameter information.

The imaging apparatus 110 generates the second and subsequent sets of output data based on secret sharing data including a combination of unit data and parameter information ($D_i$, $W_{i-1}$).

The server apparatus 120 regenerates secret sharing data including a combination of unit data and parameter information ($D_i$, $W_i$) and performs signature verification.

According to an aspect of the third embodiment, a delay in streaming output data caused by a hashing process for calculating a hash value (Hash($D_i$)) can be avoided in addition to achieving the same effect as those of the first and second embodiments.

Other Embodiments

In the above-described first through third embodiments, a secret sharing protocol is applied to moving image data generated by the imaging apparatus 110. However, data to which the secret sharing protocol is applied is not limited to moving image data. That is, the secret sharing protocol can be applied to any time series data, such as audio data or temperature data, for example.

Also, in the above-described first and second embodiments, the hash generation unit 506 calculates the hash value of the unit data ($D_i$), and the parameter information generation unit 507 calculates parameter information ($W_i$) based on the hash value calculated by the hash generation unit 506. However, in alternatively embodiment, the parameter information generation unit 507 may be configured to directly calculate parameter information ($W_i$) based on the unit data ($D_i$), for example.

Also, in the above-described second to third embodiments, the notification timing of the signature value (S) by the signature value addition unit 1202 corresponds to the timing at which the $k^{th}$ parameter information ($W_{k-1}$) is generated. However, the notification timing of the signature value (S) by the signature value addition unit 1202 is not limited thereto and may alternatively correspond to the timing at which generation of the signature value (S) is completed, for example.

Also, although the features relating to avoiding a delay cause by a hashing process according to the third embodiment are combined with the second embodiment in the above-described example, these features may also be combined with the first embodiment.

Also, in the above-described first through third embodiments, the CPU 402 implements the secret sharing data generation unit by executing the secret sharing data generation program. However, the secret sharing data generation unit may also be implemented using a GPU (Graphics Processing Unit), for example.

Also, according to an aspect of the present invention, a data recording system is provided that includes a data generating apparatus and a data storage apparatus that is connected to the data generating apparatus. The data generating apparatus implements processes of sequentially acquiring n sets of data (where n is an integer greater than or equal to 2) included in a predetermined section of time series data and calculating, based on the acquired data, parameter information satisfying a polynomial of degree (k−1) including k random numbers (where k is an integer greater than or equal to 1 and less than n); generating a signature value by adding a signature to secret information based on a secret sharing protocol, the secret information being calculable by acquiring k sets of the acquired data and the parameter information calculated based on the acquired data; and outputting output data including the signature value and a set of the acquired data and the parameter information calculated based on the acquired data.

According to a further aspect of the present invention, the data storage apparatus implements a process of receiving the output data, and a first tampering determination process of determining whether signature verification is successful based on whether at least k sets of the output data have been received.

According to a further aspect of the present invention, when the data storage apparatus determines that at least k sets of the output data have been received, the data storage apparatus further implements a first calculation process of calculating secret information based on the k sets of the acquired data and the parameter information calculated based on the acquired data included in the received output data, a second calculation process of calculating secret information based on the signature value included in a set of output data of the received output data, and a second tampering determination process of determining whether signature verification is successful by comparing the secret information calculated by the first calculation process and the secret information calculated by the second calculation process.

According to a further aspect of the present invention, in the first calculation process, the data storage apparatus generates the k sets of the acquired data and the parameter information calculated based on the acquired data based on (k+1) sets of the received output data and calculates the secret information based on the generated k sets of the acquired data and the parameter information calculated based on the acquired data.

Although the present invention has been described above with reference to certain illustrative embodiments, the present invention is not limited to these embodiments, and numerous variations and modifications may be made without departing from the scope of the present invention.

What is claimed is:

1. A data generating apparatus comprising:
   a memory storing a program; and
   a processor configured to execute the program to implement processes of
      sequentially acquiring n sets of data (where n is an integer greater than or equal to 2) included in a predetermined section of time series data and calculating, based on the acquired n sets of data, parameter information satisfying a polynomial of degree (k−1) including k random numbers (where k is an integer greater than or equal to 1 and less than n);
      generating a signature value by adding a signature to secret information based on a secret sharing protocol, the secret information being calculable by acquiring k sets of the acquired n sets of data and the parameter information calculated based on the acquired n sets of data; and
      outputting output data including the signature value and a set of the acquired n sets of data and the parameter information calculated based on the acquired n sets of data.

2. The data generating apparatus according to claim 1, wherein the processor includes the signature value in a k-th set and subsequent sets of the output data to be output.

3. The data generating apparatus according to claim 2, wherein the processor generates the signature value while calculating first to k-th sets of the parameter information.

4. The data generating apparatus according to claim 1, wherein the processor calculates the parameter information based on a hash value of the acquired n sets of data.

5. The data generating apparatus according to claim 4, wherein the processor includes in the output data, a combination of an i-th set of the acquired n sets of data (where i is an integer greater than 1) and an (i−1)th set of the parameter information calculated based on an (i−1)th set of the acquired n sets of data.

6. A data generating method comprising steps of:
   sequentially acquiring n sets of data (where n is an integer greater than or equal to 2) included in a predetermined section of time series data and calculating, based on the acquired n sets of data, parameter information satisfying a polynomial of degree (k−1) including k random numbers (where k is an integer greater than or equal to 1 and less than n);
   generating a signature value by adding a signature to secret information based on a secret sharing protocol, the secret information being calculable by acquiring k sets of the acquired n sets of data and the parameter information calculated based on the acquired n sets of data; and
   outputting output data including the signature value and a set of the acquired n sets of data and the parameter information calculated based on the acquired n sets of data.

7. A computer program product comprising a non-transitory computer-readable medium having a program recorded thereon that is executable by a computer, the program when executed causing the computer to perform steps of:
   sequentially acquiring n sets of data (where n is an integer greater than or equal to 2) included in a predetermined section of time series data and calculating, based on the acquired n sets of data, parameter information satisfying a polynomial of degree (k−1) including k random numbers (where k is an integer greater than or equal to 1 and less than n);
   generating a signature value by adding a signature to secret information based on a secret sharing protocol, the secret information being calculable by acquiring k sets of the acquired n sets of data and the parameter information calculated based on the acquired n sets of data; and
   outputting output data including the signature value and a set of the acquired n sets of data and the parameter information calculated based on the acquired n sets of data.

* * * * *